United States Patent
Haghanegi

(10) Patent No.: US 10,120,522 B2
(45) Date of Patent: Nov. 6, 2018

(54) USER INTERFACE

(71) Applicant: Masoud Haghanegi, Chicago, IL (US)

(72) Inventor: Masoud Haghanegi, Chicago, IL (US)

(73) Assignee: Goma Systems Corporation, Chicago, IL (US)

( * ) Notice: Subject to any disclaimer, the term of this patent is extended or adjusted under 35 U.S.C. 154(b) by 1010 days.

(21) Appl. No.: 14/182,160

(22) Filed: Feb. 17, 2014

(65) Prior Publication Data

US 2014/0229870 A1    Aug. 14, 2014

Related U.S. Application Data

(63) Continuation of application No. 12/224,629, filed as application No. PCT/US2007/005593 on Mar. 6, 2007, now Pat. No. 8,701,026.

(51) Int. Cl.
| | |
|---|---|
| A63F 13/833 | (2014.01) |
| A63F 13/23 | (2014.01) |
| A63F 13/20 | (2014.01) |
| A63F 9/24 | (2006.01) |
| G06F 3/02 | (2006.01) |
| G06F 3/0481 | (2013.01) |
| A63F 13/42 | (2014.01) |
| G06F 3/0346 | (2013.01) |

(Continued)

(52) U.S. Cl.
CPC ............ *G06F 3/0481* (2013.01); *A63F 13/06* (2013.01); *A63F 13/42* (2014.09); *G06F 3/015* (2013.01); *G06F 3/023* (2013.01); *G06F 3/038* (2013.01); *G06F 3/0346* (2013.01); *G06F 3/03547* (2013.01); *G06F 3/0489* (2013.01); *G06F 3/04892* (2013.01); *A63F 2300/1018* (2013.01); *A63F 2300/301* (2013.01); *A63F 2300/308* (2013.01); *H04M 1/72544* (2013.01)

(58) Field of Classification Search
CPC ...................................................... G06F 3/0481
USPC ......................................................... 715/706
See application file for complete search history.

(56) References Cited

U.S. PATENT DOCUMENTS

| | | |
|---|---|---|
| 6,002,401 A | 12/1999 | Baker |
| 6,319,121 B1 | 11/2001 | Yamada et al. |

(Continued)

FOREIGN PATENT DOCUMENTS

WO    WO2007103312 A2    9/2007

OTHER PUBLICATIONS

International Search Report in International Application No. PCT/US2007/005593 dated Feb. 13, 2008, 2 pages.

(Continued)

*Primary Examiner* — Jeffrey A Gaffin
*Assistant Examiner* — Nhat Huy T Nguyen
(74) *Attorney, Agent, or Firm* — Lempia Summerfield Katz LLC

(57) ABSTRACT

A system and method for enhancing a controller interface is provided. In one embodiment, the system may include an input device, an input interface, a processor, and a display. The method is capable of associating input components on the input device with input options available for controlling the virtual characters. The method is further capable of associating the input components with origin points of a virtual representation of a user and target points of a virtual representation of an opponent. The method further allows a user to control a virtual character not representing the user.

16 Claims, 19 Drawing Sheets

(51) Int. Cl.
*G06F 3/0489* (2013.01)
*G06F 3/01* (2006.01)
*G06F 3/023* (2006.01)
*G06F 3/038* (2013.01)
*G06F 3/0354* (2013.01)
*H04M 1/725* (2006.01)

(56) References Cited

U.S. PATENT DOCUMENTS

| | | | |
|---|---|---|---|
| 7,386,799 B1* | 6/2008 | Clanton | A63F 13/12 |
| | | | 715/753 |
| 7,391,420 B1 | 6/2008 | Coyne | |
| 7,666,097 B2 | 2/2010 | Mori et al. | |
| 2002/0111944 A1 | 8/2002 | Rowley | |
| 2002/0119811 A1* | 8/2002 | Yabe | A63F 13/10 |
| | | | 463/8 |
| 2003/0110926 A1 | 6/2003 | Sitrick et al. | |
| 2004/0031058 A1 | 2/2004 | Reisman | |
| 2004/0097221 A1* | 5/2004 | Lee | H04M 3/42382 |
| | | | 455/419 |
| 2004/0138516 A1 | 7/2004 | Osorio et al. | |
| 2004/0233223 A1* | 11/2004 | Schkolne | G06F 3/0346 |
| | | | 345/621 |
| 2004/0243364 A1 | 12/2004 | Wendelin et al. | |
| 2005/0167907 A1 | 8/2005 | Curkendall et al. | |
| 2008/0158232 A1 | 7/2008 | Shuster | |
| 2008/0195699 A1* | 8/2008 | Min | H04L 12/1822 |
| | | | 709/203 |

OTHER PUBLICATIONS

Written Opinion in International Application No. PCT/US2007/005593 dated Feb. 13, 2008, 11 pages.

Turner, Russell et al., "Interactive Construction and Animation of Layered Elatically Deofrmable Characters," In Computer Graphics Forum, vol. 17, Issue 2, pp. 135-152, 1998.

* cited by examiner

USER INTERFACE

RELATED APPLICATIONS

This application is a divisional/continuation application of U.S. application Ser. No. 12,224,629, filed Sep. 2, 2008 as a § 371 nationalization of PCT Application PCT/US2007/005593, filed Mar. 6, 2007, both of which claim the benefit of U.S. Provisional Patent Application No. 60/780,395, filed Mar. 7, 2006, and U.S. Provisional Patent Application No. 60/831,877, filed Jul. 18, 2006, the entire contents of which are hereby incorporated by reference.

TECHNICAL FIELD

The present embodiments relate to user interfaces, and in particular, how the input from one or more user interfaces may be used to control virtual characters in an environment.

BACKGROUND

Current video games typically implement an interface that only allows a user to control a virtual representation of himself or herself in a limited, and often, arbitrary manner. Generally, these video games do not allow a user to control the actions performable by a virtual character other than a virtual character representing the user. For example, hitting an arbitrarily assigned button twice followed by another arbitrarily assigned button once may cause a virtual character representing the user to jump-up and kick another virtual character. Just as it is often difficult for users to remember these arbitrary button combinations, it is difficult for developers of such virtual content to realistically represent the virtual characters and their individual and collective movements in a meaningful and accessible way via the interface. Furthermore, the variety of interfaces in the marketplace makes it even more difficult to provide such ideal control with uniformity. This is especially true when one considers the wide range of human movements in activities diverse as fighting, sports, dance and sexual activity over which the various interfaces attempt to give users control.

Hence, there is a need for a system and method that allows users to intuitively exercise control over the movements of virtual characters.

BRIEF SUMMARY

A system and method for enhancing a controller interface is provided. In one embodiment, the system comprises an input device, an input interface, a processor, and a display. The input interface is capable of receiving inputs from input components on the input device. The processor is capable of interpreting the received input. The processor relates the input components with outputs to (1) control with the input device by representation of a target or "Other" on the input device, (2) define core and secondary movements for use with the input device, (3) control a virtual self or representation of the user to move a limb without further interaction with the virtual environment or without striking a target, (4) control a virtual self or representation of the user controlled object to grab or deflect in response to a targets attempted to strike the virtual self or representation, such as by a rotational input, (5) define an origin or portion of the virtual self or representation to be controlled or used for striking based on rotational position of the self or representation or (6) combinations thereof. The display can then display as a function of the input interpreted by the processor.

The method is capable of associating input components on the input device with input options available for controlling the virtual characters. The method is further capable of associating the input components with origin points of a virtual representation of a user and target points of a virtual representation of an opponent. For example, one button corresponds to the left arm or hand of the virtual self, and another button corresponds to the head of the virtual opponent. Selecting the two buttons indicates the left arm of the virtual self interacting with the head of the virtual opponent. The method is also capable of modifying an action performed by a virtual representation of a user when the virtual representation of the user rotates about an associated primary axis. The method is also capable of altering the axis of operation of a segment of a virtual representation of a user. The method is also capable of independently operating a segment, such as a limb, of a virtual representation of a user. The method is further capable of performing a reduction on the number of input components on an input device where the number of input options available is greater than the number of input components.

DETAILED DESCRIPTION

Figure 1:
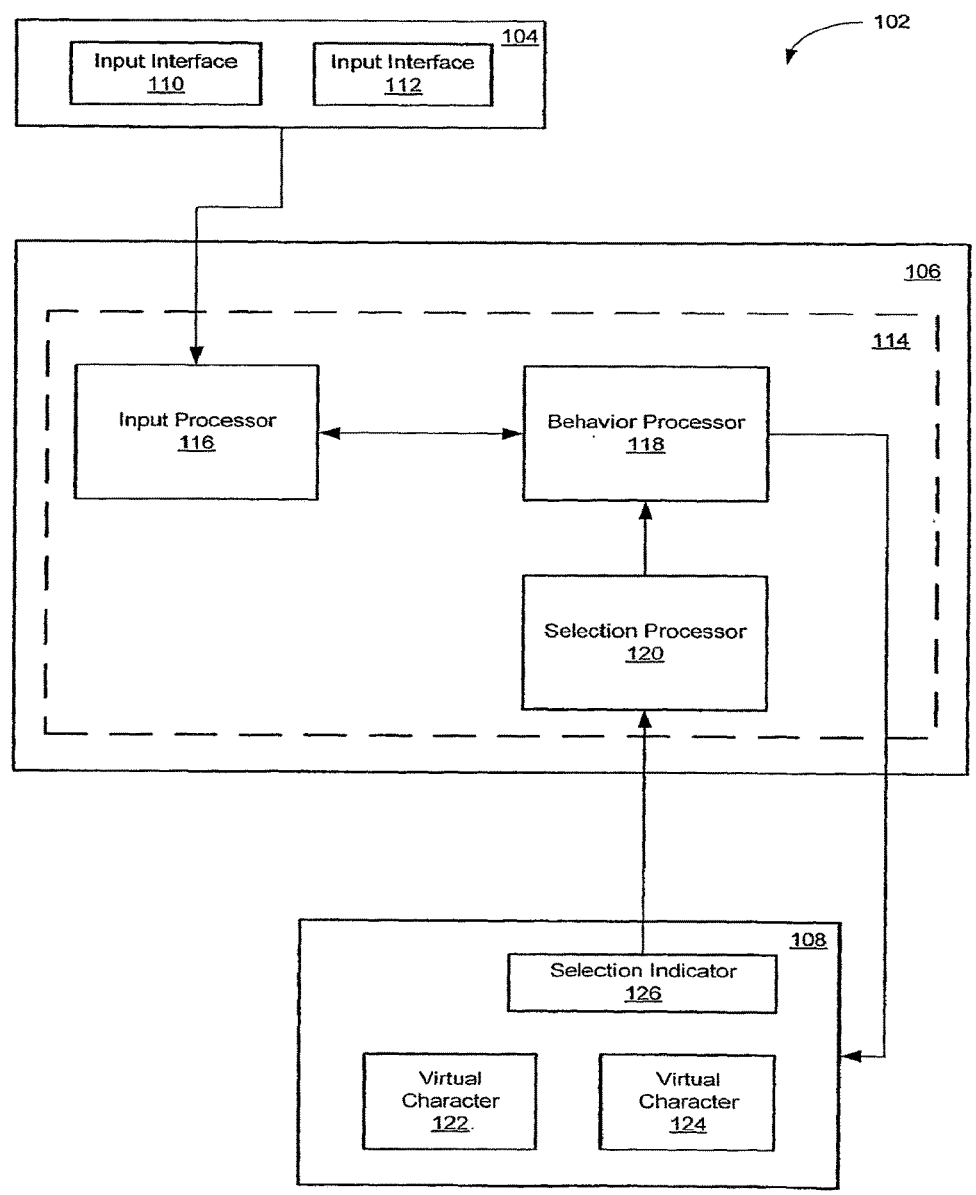
FIG. 1 is one embodiment of a system for controlling virtual characters.

FIG. 1 is an example of one embodiment of a system 102 for controlling virtual characters. The system 102 may be used for gaming on any device, such as personal computer, console, cellular phone, handheld device or other gaming device. Various types of games may use the system, such as martial arts, sports, arcade, educational training, or other types of games, such as adult entertainment games. The system 102 may be provided for robotic control or virtual training. In another embodiment, the system 102 operates for programming or creating graphics, such as controlling a model in CGI.

In embodiment shown in FIG. 1, the system 102 includes an input device 104, a computer 106, and a display 108. The computer 106 includes a general processor 114, which includes an input processor 116, a behavior processor 118, and a selection processor 120. The general processor 114 may include more or less processors than shown in FIG. 1. The display device 108 is coupled with the computer 106 and is operative to display a first virtual character 122, a second virtual character 124, and a selection indicator 126.

In one embodiment, the input device 104 has a first input interface 110 for controlling a virtual representation of a "Self" 122 and a second input interface 112 for controlling a virtual representation of an "Other" 124. The input device may also include additional input interfaces for controlling the "Self" 122, "Other" 124, or additional virtual representations. By providing a second interface 112 for control of the virtual representation representing the "Other" 124, a user can independently control the actions of the "Other" 124 irrespective of the input received for the "Self" 122. Thus, the behavior exhibited by the "Self" 122 may be independent of the behavior of the "Other" 124. For example, the user can cause desired actions performable by the "Other" 124 to be performed on the "Self" 122.

The first input interface 110 and the second input interface 112 are capable of receiving input from a user interacting with the input device 104. For example, the first input interface 110 and the second input interface 112 may provide input components for the user on the input device 104 that allow the user to interact with the input device 104, the computer 106, the display 108, or combinations thereof. In one embodiment of the first input interface 110 and the second input interface 112, the input components are digital input components. An example of digital input components include buttons. For example, each of the first input interface 110 and the second input interface 112 may comprise a 2-button configuration, a 3-button configuration, a 4-button configuration, any other number of buttons, or combinations thereof. For example, in a 2-button configuration, the buttons on each of the input interfaces 110,112 may be labeled as A and B. As another example, in a 4-button configuration for each of the input interfaces 110,112, the buttons may be labeled as A, B, C, and D.

Alternatively, or in addition to the digital input components previously discussed, the first input interface 110, the second input interface 112, or combinations thereof, may also comprise analog input components. For example, the input components may comprise an analog joystick located on the input device 104. In this example, a user may interact with the analog joystick that senses position changes in four or more directions to send an input from the input device 104 to the computer 106 via input processor 116. Alternatively, or in addition to a joystick, one or more analog inputs, such as a rocker pad or touch pad may be provided on the input device 104.

Alternatively, or in addition to button input components or joystick input components, tactile and non-tactile input components are also possible on the input interface 110, the input interface 112, the input device 104, or combinations thereof. An example of a tactile input component includes touch-sensitive technology, such as found on a touch-screen liquid crystal display (LCD). Examples of non-tactile input components include gyroscopic, magnetic coils, optical, image viewing, ultrasound or other position sensing technology capable of receiving an input from the user interacting with the input device 104. Where the input device 104 includes one or more of the non-tactile input components previously described, the user can provide input to the input device 104 by changing the orientation of the input device 104 relative to the user. The input device 104 may also be free of an object operated by the user, such as sensing changes in position of the user or portion of the user, such as the hands, the fingers, other limbs, or combinations thereof. It is also possible that the input components include a light sensor capable of detecting variations in light. Another possibility is that the input components include a sound sensor capable of detecting variations in sound, an electromagnetic sensor, a pressure and/or temperature sensor capable of detecting physiological responses, any other now known or later developed sensor capable of detecting physiological responses, or combinations thereof.

In one embodiment, the input device 104 is a game controller that includes digital input components, analog input components, any other now known or later developed input components or combinations thereof. For example, the game controller can have several buttons (e.g., 4, 6, 8 or other number) with one or more (e.g., 3) analog joystick and/or rocker pad controller components. Although later developed input devices are contemplated, the input device 104 can be a Sony® Playstation® controller, available from Sony Computer Entertainment Inc. located in Tokyo, Japan; a Nintendo® GameCube® controller, available from Nintendo Co., Ltd. located in Kyoto, Japan; and a Microsoft® XBOX® controller, available from Microsoft Corp. located in Redmond, Wash. In other embodiments, the input device 104 is a keyboard, mouse, touch pad, trackball, joystick and/or other personal computer or workstation input, or combinations thereof. In another embodiment, the input device 104 is a telephone or cellular phone keypad. In yet a further embodiment, the input device 104 is an Apple® IPod® available from Apple Inc. Corp., located in Cupertino, Calif. The input device 104 is a single device, but includes separate devices in other embodiments.

The input device 104 may provide input to the general processor 114 of the computer 106 using a wired connection, a wireless connection, or combinations thereof. For example, the wired connection may be a cable connection and/or or a standard Universal Serial Bus (USB) connection, a twisted pair connection, a coaxial cable connection, a serial bus connection, a PS/2 connection, an IDE connection, a SCSI connection, or any other now known or later developed connection, or combinations thereof. Examples of wireless connection include, infrared, ultrasound, radio frequency, Bluetooth, 802.11 a/b/g/n, any other now known or later developed wireless connections, or combinations thereof.

As used herein, the term processor means a processor implemented in hardware, a processor implemented in software, or combinations thereof. Examples of a processor implemented in hardware include a computer processor, a digital signal processor, a field programmable gate array, an application specific integrated circuit, an analog circuit, a digital circuit, combinations thereof or other now known or later developed processor.

In one example, a hardware processor is a processor capable of interpreting x86 instructions, such as the Pentium IV processor available from Intel Corporation. In another example, a hardware processor includes a processor based on a Reduced Instruction Set Computer (RISC) architecture, such as the Scalable Performance Architecture (SPARC) processors available from Sun Microsystems. In yet a farther example, a hardware processor includes a processor based on a Complex Set Instruction Computer architecture (CISC).

The general processor 114 is a processor provided in a personal computer, workstation or handheld device, but may be in another location, such as a remote location in a network. Although a hardware processor is contemplated as encompassing the architectures discussed above, it should be appreciated that additional architectures are also contemplated, such as embedded processors.

Examples of a software processor include a processor implemented in a computer language and operative to perform an action based on a constant input, a predetermined input, a variable input, or combinations thereof. A software processor could also be a computer program, function, method, operation, script, any other now known or later developed programming type, or combinations thereof. Examples of computer languages include, but are not limited to, C, C++, Java, Perl, PHP, VHDL, Verilog, SystemC, any other now known or later developed computer programming language, or combinations thereof.

In one embodiment, the general processor 114 is integrated with the input device 104, such as an application specific integrated circuit for operating the input device 104. More than one processor may operate the controller interface, such as using different processors for serial or parallel processing or using a network of processors.

As shown in FIG. 1, the general processor 114 includes an input processor 116, a behavior processor 118, and a selection processor 120. Alternatively, the input processor 116, the behavior processor 118, and the selection processor 120 may be separate and distinct processors, the same processor, or combinations thereof. The input processor 116, the behavior processor 118, and the selection processor 120 may be the same type of processor as the general processor 114, a different type of processor than the general processor 114, implemented by the processor 114, or combinations thereof.

The input processor 116 receives the input from the input components provided in the first and second input interfaces 110, 112. The input processor 116 is further operative to parse the input received from the input device 104. The parsed input from the input processor 116 may be passed to the behavior processor 118, the selection processor 120, the display 108, any other device, or combinations thereof. In one embodiment, the parsed input from the input processor 116 includes a sequence of alphanumeric characters representing the input components manipulated by the user of the input device 104.

The input processor 116 is also capable of determining the type of input received from one or more of the input interfaces 110, 112. For example, the type of input may be a binary input associated with a numerical input component of the input device 104. In another example, the type of input may be the amount of pressure applied to an input component located on the input device 104. Other types of analog input capable of being detected by the input processor include the degree of movement by the input component, the duration of pressure applied to the input component, or combinations thereof. Based on the sequence of alphanumeric characters received by the input processor 116, the input processor can communicate with the behavior processor 118 to cause an action in the virtual characters 122,124 displayed on the display 108. The number of activations, length of activation, or pressure of activation on the input device 104 may control a corresponding action in one or more virtual characters 122, 124, such as an amount of force a virtual character 122 applies to another virtual character 124, or length of travel of one or more virtual characters 122,124. For example, pressing a button twice may indicate an amount of insertion or greater force applied in a punch.

The display 108 coupled with the selection processor 120 is operative to display one or more virtual characters 122, 124, and a selection indicator 126. The selection indicator 126 may be positioned near a first virtual character 122, a second virtual character 124, more or less virtual characters, or combinations thereof. In one embodiment, the selection indicator 120 is overlaid on one or more virtual characters to indicate the portion of the one or more virtual characters 122,124 selected. In an alternative embodiment, the selection indicator 120 is displayed as part of one or more of the virtual characters 122,124. Each virtual character 122,124 may have his or her own selection indicator 120, a common selection indicator 120, or combinations thereof. In alternative embodiments, a separate selection indicator 120 is not provided.

In one embodiment, the first virtual character 122 represents the user and the second virtual character 124 represents, a non-user, a non-player, a computer-controlled player, a virtual character for another user, or combinations thereof. As used herein, the first virtual character 122 representing the user is referenced as the "Self" 122 and the second virtual character 124 that does not represent the user is referenced as the "Other" 124. As an example, the first and second virtual characters 122,124 may represent a female and male character where the user is female. In one embodiment, the input interface for "Self" 122 and the input interface for "Other" 124 are located on the same input device. For example, the input interfaces may be located on a mobile phone. The input interfaces could also be located on another input device, such as a video game controller. In another embodiment, the input interface for "Self" 122 and the input interface for "Other" 124 are located on different input devices. The input interface for "Self" 122 and the input interface for "Other" 124 indicate different controllable aspects of the virtual characters, such as the head, limbs, and other body parts. The system is capable of receiving a series of activations from the input interface corresponding to either the "Self" 122 or the "Other" 124.

The display 108 may be a cathode ray tube (CRT), a liquid crystal display (LCD), a projector, a printer, a plasma screen, or other now known or later developed display. Other non-visual outputs may be used alternatively or additionally, such as audio speakers, or a haptic device.

As explained below, a user can use an input component on the one or more input interfaces 110, 112, to manipulate the selection indicator 126 to select a portion of one or more of the virtual characters 122,124. The selection processor 120 coupled with the display 108 is operative to receive the input from the input processor 116 and translate that input into a portion of the one or more virtual characters 122, 124 indicated by the selection indicator 126. The selection processor 120 is further operative to communicate the portion of the virtual character 122, 124 selected as indicated by the selection indicator 126 to the behavior processor 118. Based on the one or more portions of the one or more virtual characters 122, 124 selected by the user as indicated by the selection indicator 126 and the input received from the input processor 116, for example, such as the parsed input of the sequence of alphanumeric characters, the behavior processor 118 determines the action to be performed by the first virtual character 122, the second virtual character 124, or combinations thereof. For example, the parsed input and the selection indicator 126 may indicate to the behavior processor 118 that the first virtual character 122 is to perform an action on the second virtual character 124. In alternative embodiments, the behavior processor 118 operates based on user input without the selection indicator 126 on the display 108.

In one embodiment, the behavior processor 118 outputs controls or data responsive to the determined action. The output causes a change in the image represented by the virtual characters 122, 124 or causes a different image to be displayed. In another embodiment, the behavior processor 118 can further cause a change in the displayed output or controls general processing associated with the display, such as controlling artificial intelligence of a virtual object, one or more of the virtual characters 122, 124, or combinations thereof.

Figure 2:
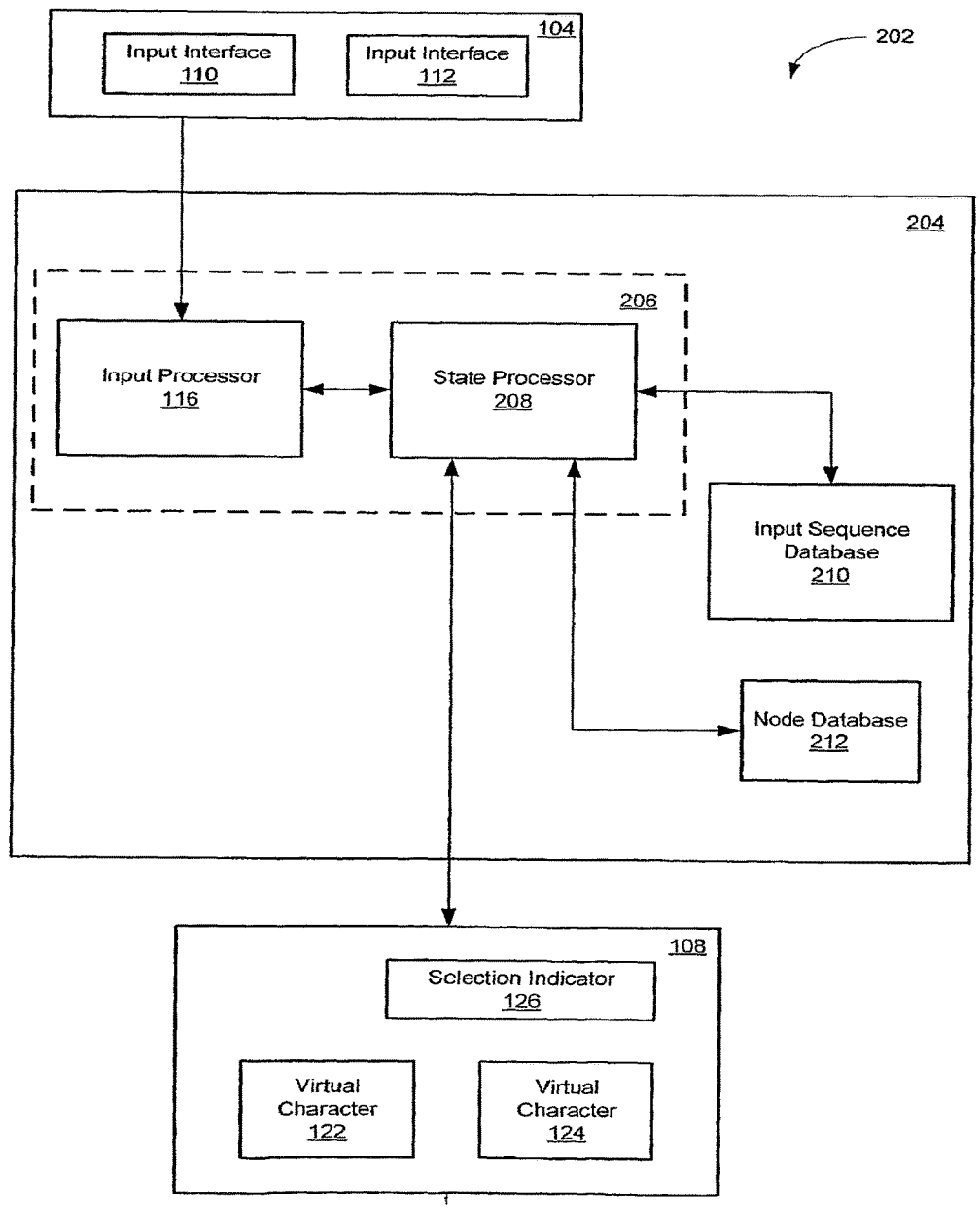
FIG. 2 is an alternative embodiment of a system for controlling virtual characters.

FIG. 2 is an alternative embodiment of a system 202 for controlling virtual characters. The alternative embodiment of the system 202 may include more or less components as shown in FIG. 1. For example, in one embodiment, the system 202 includes the input device 104, a computer 204, and the display 108. The computer 204 includes a general processor 206, an input sequence database 210, and a node database 212. The general processor 206 may include more or less processors than shown in FIG. 1 and, for example, may include the input processor 116 and a state processor 208.

In general, a database is understood as a collection of data structured and organized in a disciplined fashion so that access is possible quickly to information of interest. A database may be a flat database, a hierarchical database, a network database, a relational database, an object database, any other now known or later developed database, or combinations thereof. The database may be implemented in one or more database implementation software including, but not limited to, dBase®, available from Borland International, Inc. located in Scotts Valley, Calif., Microsoft® SQL Server available from Microsoft Corp. located in Redmond, Wash., mySQL® available from MySQL AB Ltd. Co. located in Stockholm, Sweden, or Oracle® available from Oracle Int. Corp. located in Redwood City, Calif. A custom or different database, such as a look-up table, may be used.

The node database 212 and the input sequence database 210 may be the same database, different databases, or combinations thereof. The node database 212 and the input sequence database 210 may reside on the same computer 204, a different computer, or combinations thereof. The node database 212, the input sequence database 210, or combinations thereof, may be coupled with the general processor 206 using a wired connection, a wireless connection or combinations thereof.

In one embodiment, the node database 212 stores a plurality of virtual character nodes. Each node corresponds to a relationship of one or more of the virtual characters 122,124 to a virtual environment. Each node is associated with a plurality of virtual character states. As explained with reference to FIG. 3A, a node can be a primary node, a secondary node, any other degree of node, or combinations thereof.

The input sequence database 210 is coupled with the state processor 208 and stores a plurality of input sequences. An input sequence may be a series of alphanumeric characters representing the input components available on one or more input interfaces 110,112 and inputted by the user using the input device 104. An input sequence may be also an analog signal, such as an analog signal representative of the amount of pressure applied to an input component over a period of time, or the direction an input component is directed over a period of time. Each input sequence is associated with a virtual character state, node, or combination thereof. For example, an input sequence may cause the first virtual character 122 to face an opposite direction of the second virtual character 124. In another example, a second input sequence following the first input sequence may cause the virtual characters 122,124 to move from a standing position to a resting position, such as sitting or laying down.

By associating an input sequence with a virtual character state, a user can cause the virtual characters to transition from one node to another node. In one embodiment, a user can cause the virtual characters 122,124 to transition from a primary node to a primary node, a secondary node, or combinations thereof. Similarly a user can cause the virtual characters to transition from a secondary node to a primary node, another secondary node, or combinations thereof. In yet a further embodiment, a primary node is not accessible from a secondary node. One or more primary nodes may be inaccessible from another particular primary node. In one embodiment, different groups of secondary nodes correspond with different primary nodes. Some types of interaction between the characters may not be available based on the primary node or spatial relationship of the first character 122 to the second character 124. The user can control the actions of the virtual character in the primary node. The available options or secondary nodes depend on the current node or state.

Figure 3A:
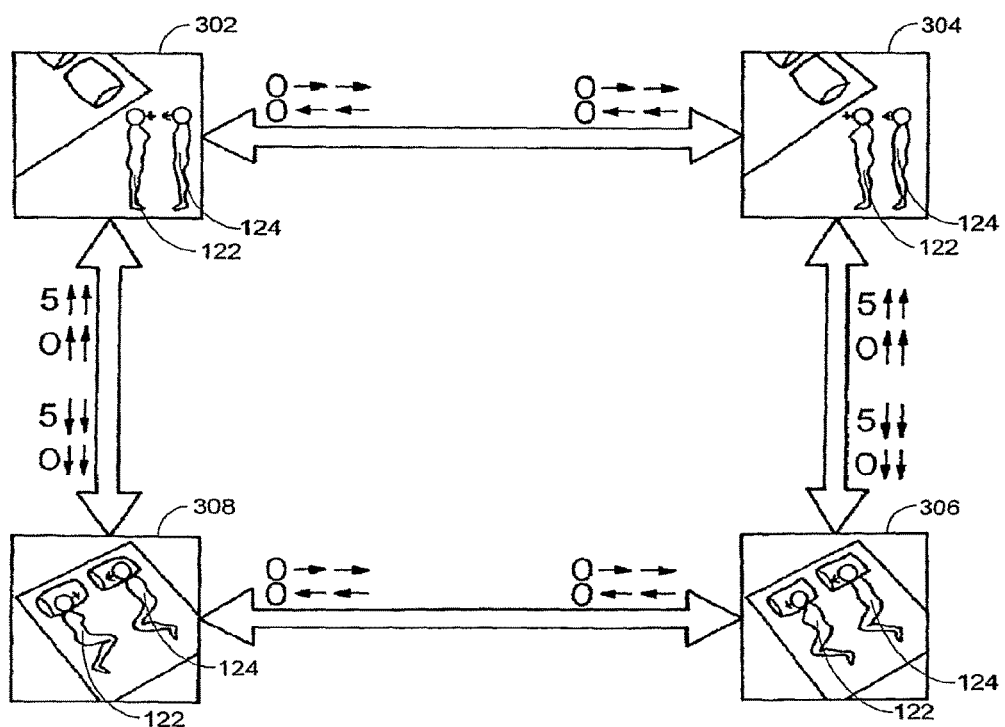
FIG. 3A is one embodiment of a flowchart illustrating primary nodes

FIG. 3A is one embodiment of a flowchart illustrating primary nodes 302,304,306,308. As shown in FIG. 3A, each primary node is associated with a virtual character state and each node is associated with an input sequence of alphanumeric characters and directional input. Virtual character states include, but are not limited to standing positions, resting positions, or combinations thereof. Virtual character states may also include active positions, inactive positions, or combinations thereof. In one example, a first primary node 302 associated with a virtual character state in which the virtual characters 122,124 are standing and facing each other. In another example, a second primary node 304 is associated with the state in which a first virtual character 122 is facing away from a second virtual character 124. A third primary node 306 is associated with the virtual character state in which the first virtual character 122 is lying down, the second virtual character 124 is lying down, and the first virtual character 122 is facing away from the second virtual character 124. A fourth primary node 308 is associated with the virtual character state in which the virtual characters 122,124 are lying down and facing each other.

To transition from the first primary node 302 to the second primary node 304, a user would enter an input sequence using the input device and one or more input interfaces of "0," right directional input, right directional input, or "0," left directional input, and left directional input. Similarly, to transition from the second primary node 304 to the third primary node 306, a user would enter an input sequence of "5," downward directional input, downward directional input, and/or "0," downward directional input, downward directional input. As shown in FIG. 3A, other input sequences cause the virtual characters 122,124 to transition from the third primary node 306 to the fourth primary node 308, and from the fourth primary node 308 to the first primary node 302. Although as shown in FIG. 3A the user can transition the virtual characters from the first primary node 302 to the fourth primary node 308 to reach the third primary node 306, more or less character states may be involved in transitioning from the first primary node 302 to the third primary node 306.

Figure 3B:
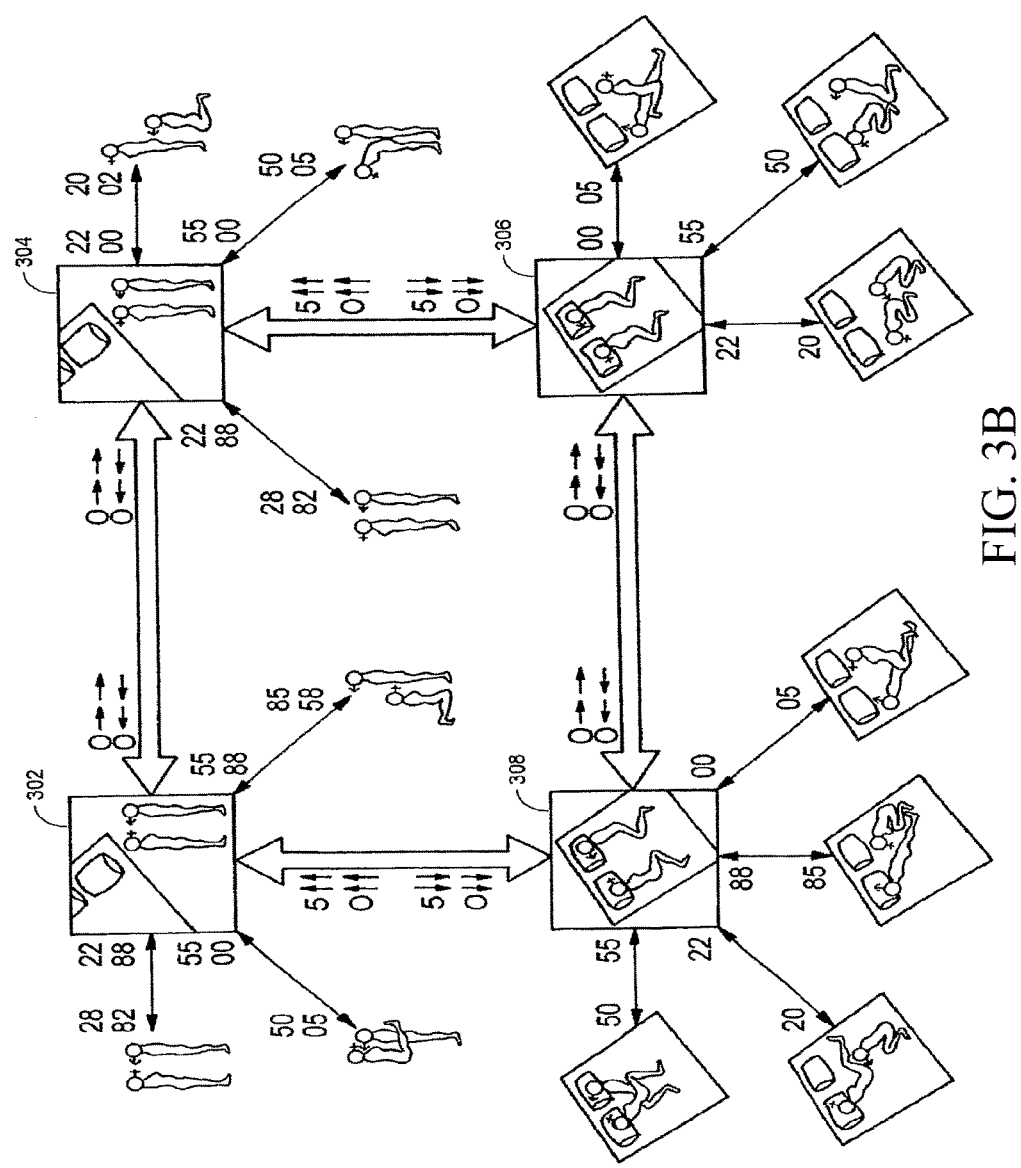
FIG. 3B is one embodiment of a flowchart illustrating primary and secondary nodes.

As discussed previously, a node can be a secondary node. FIG. 3B is one embodiment of a flowchart illustrating primary and secondary nodes. In one embodiment, a secondary node is a node associated with a virtual character state of a virtual character state type. For example, if a primary node 304 is a node in which a first virtual character is standing and facing the opposite direction of a second virtual character, a secondary node may be a node in which the first virtual character is standing and the second virtual character is in a sitting position. In another example, if the primary node 308 corresponds to a first and second virtual characters lying on a bed facing each other, a secondary node may be a node in which the first virtual character is lying down and the second virtual character is sitting atop the first virtual character.

The secondary nodes may also correspond to interactions between the virtual characters associated with a particular primary node. FIG. 3B shows different secondary nodes connected by lines to each primary node. For example, the secondary nodes associated with the primary node 302 of standing virtual characters facing each other include standing characters facing each other and kissing, standing characters facing each other with one character being supported by the other character, and standing characters facing each other with one character in a kneeling position in front of the other character. For the primary node 302 of two characters facing each other while standing, an input sequence of "2" and "8" causes the characters to transition to the secondary node of kissing. Similarly, an input sequence of "5" and "0" causes a transition to the secondary node of one virtual character being supported by the other virtual character. Alternative input sequences are also possible and may comprise of digital inputs, analog inputs, or combinations thereof.

Referring back to FIG. 2, the state processor 208 is operative to compute and alter the virtual character states of the virtual characters 122 based on an input sequence, a node identifier, and communications between the input sequence database 210, the node database 212, or combinations thereof. The node identifier may be stored in the node database 212, the input sequence database 210, or combinations thereof, and functions to identify the current node of the virtual characters 122,124. With reference to FIG. 3B, the node identifier may identify that the virtual characters 122,124 are in a primary node 302 associated with a virtual character state type of facing each other. In another example, the node identifier may identify that the virtual characters are in a secondary node associated with a virtual character state of standing, facing each other, and kissing. Using the node database 212, input sequence database 210, or combinations thereof, the state processor 208 can cause the virtual characters to transition between primary nodes, secondary nodes, or combinations thereof, and their respective virtual character states.

Figure 4:
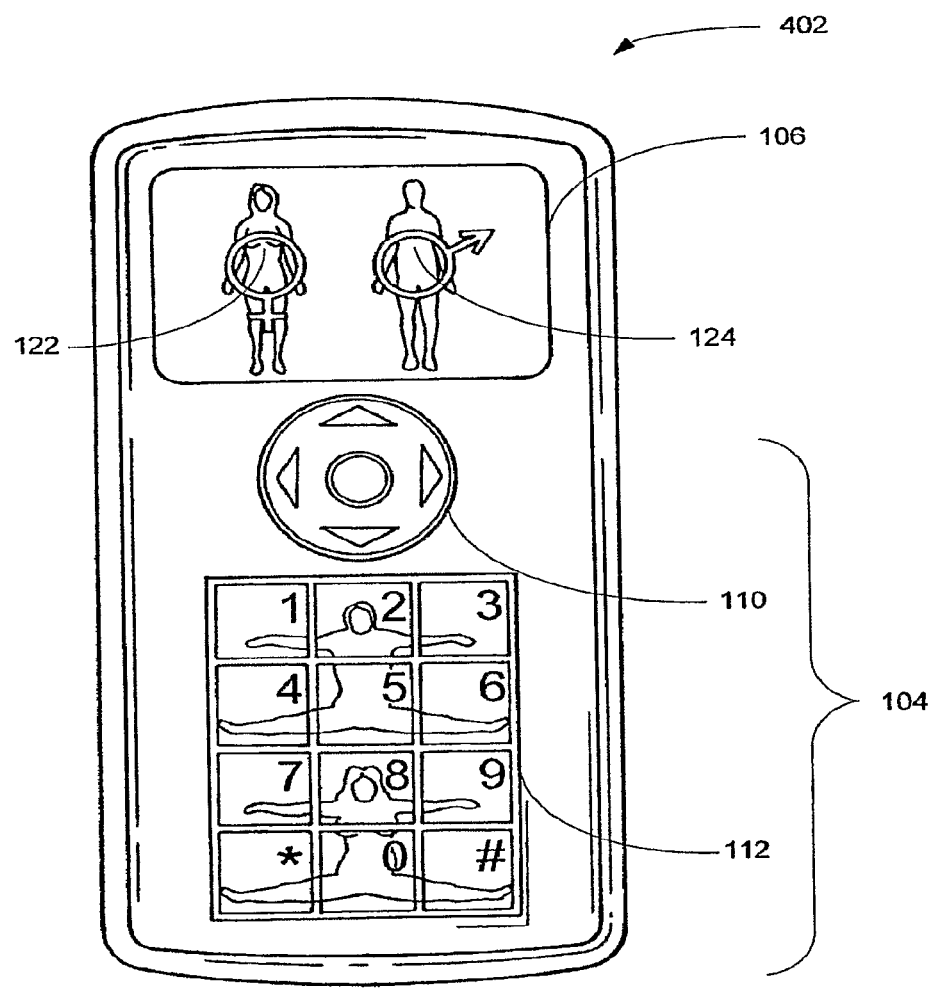
FIG. 4 is one example of a cellular phone implementing the system shown in FIGS. 1 and 2.

With reference to FIGS. 1 and 2, FIG. 4 is one example of a cellular phone 402 implementing the system 102, the system 202, or combinations thereof. The cellular phone 402 has a display 106 for representing a first virtual character 122, a second virtual character 124, more or less virtual characters or combinations thereof. The display 106 is also configured to display the selection indicator 106 (not shown). The cellular phone 402 is also used as an input device 104 that has a first input interface 110 and a second input interface 112. The first input interface 110 comprises a set of first input components, represented as directional inputs, and the second input interface 112 comprises a set of second input components, represented as alphanumeric inputs. In one embodiment, the first input interface 110 is a multi-directional input that comprises multiple inputs wherein each input corresponds to a cardinal direction, such as North, South, East, and West. Alternatively, the multi-directional inputs may be referred to as Up, Down, Left, and Right. It is also possible that the multidirectional input comprise other intermediate directional inputs, such as ordinal directions, intercardinal directions, or combinations thereof. For example, additional multi-directional inputs may include, but are not limited to, Northeast, Southeast, Southwest, and Northwest. Furthermore, each multi-directional input may be associated with one or more alphanumeric character such that it is recognizable by one or more components of the system 102 or the system 202, such as the input processor 116. The input device 104 may or may not include an overlay or picture of the virtual characters shown over the buttons.

In the example shown in FIGS. 3B and 4, the buttons of FIG. 4 may be depressed or activated to associate actions between the characters. FIG. 3B shows the button combinations for different interactions. For example, from primary node 308, depressing buttons 5 and 0 corresponding to lower body portions of the characters as shown in FIG. 4 results in moving the lower body portions together as shown at the corresponding secondary node, and which button is pressed first can determine which virtual character is on top.

Figure 5:
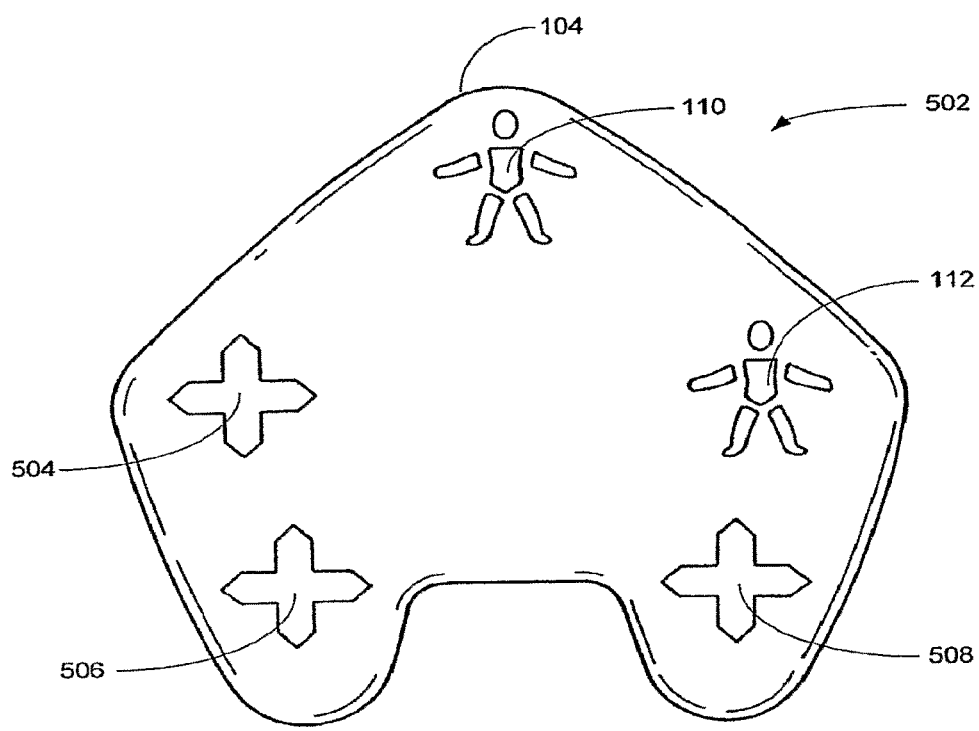
FIG. 5 is one embodiment a controller usable as an input device shown in FIGS. 1 and 2.

With reference to FIGS. 1 and 2, FIG. 5 is an example of one embodiment of a controller 502 usable as an input device 104 for use with the system 102, the system 202, or combinations thereof. With reference to FIGS. 1 and 2, the controller 502 includes a first interface 110 and a second interface 112 for controlling one or more virtual characters 122,124. While shown as human shaped, other embodiments include simple buttons or other arrangement mapped to two or more different body parts. The controller 502 also includes additional interfaces 504,506,508. The additional interfaces 504,506,508 have analog input components, digital input components, or combinations thereof. As shown in FIG. 5, the additional interfaces 504,506,508 are multi-directional input interfaces having a plurality of input components represented as multi-directional buttons, such as a left button, right button, up button and down button. Alternatively, the interfaces 504,506,508 may comprise multiple inputs wherein each input corresponds to a cardinal direction, such as North, South, East, and West. Alternatively, the multi-directional inputs may be referred to as Up, Down, Left, and Right.

It is also possible that the interfaces 504,506,508 comprise other intermediate directional inputs, such as ordinal directions, intercardinal directions, or combinations thereof. For example, additional multi-directional inputs may include, but are not limited to, Northeast, Southeast, Southwest, and Northwest. Furthermore, each multi-directional input may be associated with one or more alphanumeric character such that it is recognizable by one or more components of the system 102 or the system 202, such as the input processor 116. The user can use the controller 502 and one or more interfaces to send an input sequence to the input processor 116.

Figure 6:
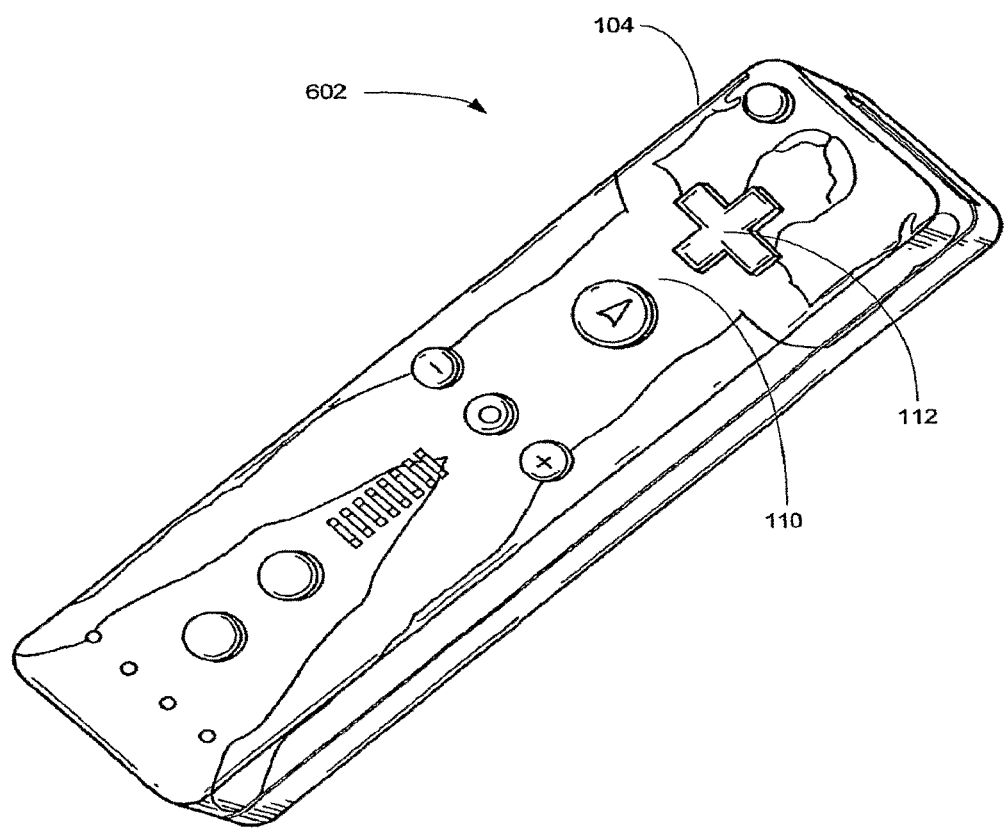
FIG. 6 is another example of a controller usable as an input device shown in FIGS. 1 and 2.

With reference to FIGS. 1 and 2, FIG. 6 is another example of a controller 602 usable as an input device 104 for use with the system 102, the system 202, or combinations thereof. The controller 602 may use a solid-state accelerometers, gyroscopes, or combinations thereof, to permit the orientation of the controller 602 as usable as the first input interface 110. The controller 602 may also have a multi-directional input as a second input interface 112. The orientations and movements permissible by the controller 602 include, but are not limited to, tilting and rotation up and down; tilting and rotation left and right; rotation along a longitudinal or lateral axis; acceleration up and down; acceleration left and right; acceleration toward an object or away from an object; or combinations thereof. The controller 602 may also use a wired connection, wireless connection, or combinations thereof for providing an input sequence to the input processor 116. In one embodiment, the controller 602 is a Nintendo® Wii® controller available from Nintendo Co., Ltd. located in Kyoto, Japan.

In one embodiment, the controller 602 is a single input device 104 that represents the first virtual character 122 (e.g., the "Self" 122). When manipulating the controller 602 in a vertical plane so that it is perpendicular to the floor, the top of the device represents the head of "Self" 122, the middle of the device is the trunk or torso, the top right and left corners of the device are the right and left arms, respectively, and the bottom right and left corners are the right and left legs, respectively.

One example of using the controller 602 to cause the "Self" 122 to perform an action is a right hook punch. If the user moves the controller 602 in a hooking pattern that leads with the top right corner, the result on the display is the "Self" 122 throwing the right hook punch. Another example is causing the "Self" 122 to perform a left hook kick If the user moves the controller 602 in a hooking pattern that leads with the bottom left corner, the result on the display is the "Self" 122 performing the left hook kick. The "Other" 124 may be represented on the display 108; therefore, the horizontal plane of the device would indicate where on the "Other" 124 the strike is taking place, such as the "Other's" head, torso, any other portion of the "Other" 124, or combinations thereof. Alternatively, there could be no "Other" 124 represented on the screen and it might be just the "Self" 122 doing a kata in a competition or the "Self" 122 dancing alone.

In causing the "Self" 122 to perform the aforementioned actions or additional actions, one or more processors, such as the input processor 116, the behavior processor 118, the state processor 208, or combinations thereof, would determine how the controller 602 is manipulated, and a node identifier is association with the input sequence database 210, the node database 212, or combinations thereof, would determine the resulting outcome.

Alternatively, or in addition to, the input devices previously described, the system 102, system 202, or combinations thereof, use a pointing device to select one or more sub-divisions of the first virtual character 122, the second virtual character 124, or combinations thereof. Examples of pointing devices include, but are not limited to, a mouse, a touch pad, or a trackball. The pointing device can be used to identify a sub-division or target point on the second virtual character 124. For example, a user may use the pointing device to identify an arm, leg, or head of the second virtual character 124. The target may be indicated by a reticule or other marker displayable on the display 108. Other input devices may be located on the pointing device, or on a separate input device, such as a keyboard.

In one embodiment, the input components of the input devices are each associated with a limb of the first virtual character 122. For example, one input component may be associated with the left hand of the first virtual character 122 and another input component may be associated with the right hand of the first virtual character 122. By using these input controls, a user can control which hand or portion of the "Self" 122 performs an action, such as firing a gun or throwing a grenade. The input components may also be associated with other parts, or sub-divisions, of the first virtual character 122 such as the head, torso, legs, any other sub-division or part, or combinations thereof.

The user of the system 102, the system 202, or combinations thereof, may view the virtual environment of the first and second virtual characters 122,124 displayed on the display 108 from the perspective of the first virtual character 122. Thus, using the pointing device and one or more input components, a user can select a target point or sub-division on the second virtual character 124 with the pointing device, and also select where an action originates on a portion of the first virtual character 122 using one or more input components. For example, the user can select the right arm of the second virtual character 124 and then use an input component corresponding to the right hand of the first virtual character 122 to perform an action, such as firing a gun, on the right arm of the second virtual character 124. By selecting another portion or sub-division of the first virtual character 122, such as the left hand, a different action may be performed, such as throwing a grenade. As an alternative to using the pointer device, the portion of the "Other" 124 may be selected by depressing a button or other user input mapped to the "Other" 124.

With reference to FIGS. 1 and 2, a method disclosed herein maps different input device input components on the input interfaces 110,112 to different virtual movements performable by one or more virtual characters 122,124. A person, animal, robot or other virtual character, may have one or more definable movements. For example, a human represented in a game has movements that may be performed by the four limbs, the trunk or torso, the head, any other portions, or combinations thereof. By assigning input components of the input device 104 based on representation of the known motion capabilities of the virtual character, control of the virtual character may be more intuitive or logical. The assigning of the input components on the input device 104 may be performed by the behavior processor 118, the selection processor 120, the state processor 208, the input sequence database 210, the node database 212, or combinations thereof.

Similarly, a target object or one or more virtual characters 122,124 have spatial distribution. For example, a target human represented in a game has different body parts. By representing the different body parts of the target on the input device 104, the first virtual character 122, the second virtual character 124, or combinations thereof, may be made to interact with a target or other virtual character in an intuitive or logical way.

In one embodiment of the method, the method provides a target, such as a second virtual character 124, having a plurality of target points. The method also provides an origin body, such as a first virtual character 122, having a plurality of origin points. Origin points and target points include, but are not limited to, limbs, extremities, a head, a bottom, a distinguishable feature, any other now known or later developed targetable area, or combinations thereof. The method further associates a first input from a first input component, such as a button or multi-directional input, of the input device 104 with a first target point. The method also encompasses receiving the first input from the first input component, such as by the input processor 116, and, then performing an action on the first target point based on the first input from the first input component of the input device 104.

The target of one embodiment of the disclosed systems and methods may be a virtual representation of an opponent in a videogame. As discussed previously with reference to FIGS. 1 and 2, the opponent may be represented by the second virtual character 124, denoted herein as the "Other" 124. In this embodiment, the "Other" 124 may be further represented by target points wherein each target point corresponds to a limb or body part of the "Other" 124. For example, the "Other" 124 may be represented by six target points, such as the head, the torso or trunk, the left arm, the right arm, the right leg, and the left leg. As shown in FIG. 4, the "Other" 124 is represented on the first input interface 112 using six alphanumeric buttons as input components. The first input interface 112 assigns Button 1 to the right arm, Button 2 to the head, Button 3 to the left arm, Button 4 to the right leg, Button 5 to the upper torso and/or lower torso, and Button 6 to the left leg. While the "Other" 124 may be represented by six target points, it is also possible that the target may be represented by fewer or additional target points. For example, the "Other" 124 may be represented by one input component, four input components, six input components, nine input components, any other number of input components, or combinations thereof. The number of target points could also correspond to the number of sub-divisions of the "Other" 124 represented by the second virtual character 124.

By representing the "Other" 124 on the input device 104, the user may target actions to specific locations on the "Other" 124 in an intuitive or logical manner. For example, in the six-input component embodiment shown in FIG. 4, the user depresses Button 8 to strike the head, Button 0 to strike the torso, or Button 9 to strike the left arm. Spatial representation of the "Other" 124 on the input device allows for targeted actions towards or on the other. The targeting may provide more versatile control, such as allowing attempts to trip or hinder movement associated with particular parts of a virtual opponent.

As previously discussed with reference to FIGS. 1 and 2, the method provides for a representation of a user represented by the first virtual character 122 referred to as the "Self" 122. The "Self" 122 may be further represented by origin points wherein each origin point corresponds to a limb or body part of the "Self" 122. With reference to FIG. 4, the "Self" 122 may be represented by six target points, wherein each target point is associated with a corresponding input component on the input interface 112. Target points include, but are not limited to, the head, the torso or trunk, the left arm, the right arm, the right leg, the left leg, any other possible body part or portion of the body, or combinations thereof. The target points are associated with the input components on the input interface 112 such that Button 7 represents the right arm, Button 8 represents the head, Button 9 represents the left arm, Button * represents the right leg, Button 0 represents the upper and/or lower torso, and Button # represents the left leg. The number of target points could also correspond to the number of sub-divisions of the "Self" 122 represented by the first virtual character 122. Other button to character mappings may be provided or used.

Associating the input component with the input interface 112, the input interface 110, more or less input interfaces, or combinations thereof, may be performed by the input processor 116, the behavior processor 118, the selection processor 120, the state processor 208, the input sequence database 210, the node database 212, any other components of the system 102 or system 202, or combinations thereof. While the "Self" 122 may be represented by six target points, it is also possible that one or more virtual objects or characters may be represented by fewer or additional target points. For example, the "Self" 122 may be represented by one input component, four input components, six input components, nine input components, any other number of input components, or combinations thereof.

In one embodiment of the method, the method may classify movements performable by the first virtual character 122 as "core" movements and "non-core" movements. "Core" movements may be defined as basic movements performed in a linear fashion along a three-dimensional Cartesian coordinate system, such as the x-axis, y-axis, or z-axis. Alternatively, in two-dimensions, "core" movements may be performed along the x-axis or y-axis. Examples of "core" movements include, but are not limited to, the directions of "up," "down," "left," and "right," and the movements of "forward" and "backward." Alternatively, or in addition to, the examples previously given, "core" movements may be defined as the shortest linear distance between an origin point on the first virtual character 122, such as the right arm, and a target point on the second virtual character 124, such as the head.

"Non-core" movements may be defined as those movements that lie outside the "core" movements. For example, a "non-core" movement may be a movement used in reaching the target point of the second virtual character 124 from the origin point of the first virtual character 122 in a manner other than a straight line, such as an elliptical path.

In one embodiment, "core" movements are default actions performed by the first virtual character 122 on the second virtual character 124 when a "non-core" movement is not activated. For example, a non-core movement may be activated by one or more of the multi-directional inputs previously discussed. Referring to FIG. 5, a user may use the second input interface 112 to select a target point or sub-division on the second virtual character 124, and may use the first input interface 110 to select an origin point or sub-division on the first virtual character 122 to select a "core" movement for performing an action by the origin point on the target point. The user may then use the first multi-directional input 504 for executing a non-core movement performable by the first virtual character 122.

In one embodiment, the method disclosed herein modifies the first multi-directional input 504 such that the first-multidirectional input 504 is used for modifying the movement of the activated origin point of the first virtual character 122 activated by the first input interface 110. When the first-multidirectional input 504 is activated, the multi-directional input 504 can modify the manner in which the origin point of the first virtual character 122 reaches the target point of the second virtual character 124 selected using the second input interface 124.

For example, the core motion of a left hand to a head may include non-core motion of an elliptical upward motion to cause an upper cut rather than a jab. As another example, in the context of a fighting game, the first multi-directional input 504 can be used for faking a non-core movement attack such as uppercut punch; or it can be used for blocking an uppercut punch by the second virtual character 124. As another example, in the context of a dancing video game, the first and second input interfaces 110,112 can be manipulated such that first virtual character 122 engages the second virtual character 124; the user can then use the first multi-directional input 504 to move the second virtual character 124 in different directions using the activated origin points, or limbs, of the first virtual character 122.

The direction of the non-core movement may also alter the impact point, such as the top portion of the second virtual character 124, a side portion of the second virtual character 124, or other portions of the second virtual character 124. The selection of the action to be performed may also be assumed or automatic rather than requiring an input, such as the selection of a right arm of the first virtual character 122, which would indicate a punching action. For example, in the context of a solo dance routine or a martial arts kata competition, the first multi-directional input 504 can be used to change the plane of the limb movements of the first virtual character 122. In this manner, a user may select the left arm of the first virtual character 122 to perform an action on the head of the second virtual character 124 where the action is to occur from a "left" direction in an elliptical path, possibly impacting on the left side of the head.

The method also includes receiving inputs from more than one multi-directional input interface for the movement of the first virtual character 122. For example, the second multi-directional input interface 506 is used to perform "whole body" movements by the first virtual character 122. With reference to a Cartesian coordinate system, the movements performable by the first virtual character 122 include movements in a Y-plane, a Y-axis, or combinations thereof. Examples of movements in the Y-plane or Y-axis include, but are not limited to, twisting, jumping, sitting, and rotation. These types of movements are further examples of core movements because the "core" of the body of the first virtual character 122 is moved up and down along the Y-plane in a linear fashion or rotated along a Y-axis. The input from the multi-directional input interface 506 may be interpreted as an input sequence by the input processor 116 or by other components of the system 102, the system 202, or combinations thereof.

In yet another example of the method receiving input from additional multi-directional input interfaces, and with reference to a Cartesian coordinate system, a third multi-directional input interface 508 can be used to control motions in a horizontal plane (X-plane), horizontal axis (X-axis), or combinations thereof, of the first virtual character 122 (i.e., the "Self" 122). These motions include, but are not limited to, walking or running forward, backward or to either side. These movements are further examples of core movements because the "core" of the body of the first virtual character 122 is moved along the X-plane or X-axis in a linear fashion.

The method also provides for interpreting the use of combinations of the multi-directional input interface 504, the multi-directional input interface 506, and the multi-directional input interface 508. For example, using the multi-directional input interface 506 in conjunction with the multi-directional input interface 508 can produce combinations of whole body movements. The resulting combined whole body movement depends on the order, direction, or combinations thereof, in which the two multi-directional input interfaces 506,508 were activated. For example, to perform a backward roll, a user would active the downward input component on the multi-directional input interface 506 (to mimic sitting) and then activate the downward input component on the multi-directional input interface 508. As another example, a backward flip in the air may be performed by the activation of the upward input component on the multi-directional input interface 506 (to get airborne) followed by the activation of the downward input component on the multi-directional input interface 508 (to go backwards). Other actions are further possible in addition to those previously described.

While the use of multi-directional input interfaces 504, 506,008 are described, it will be appreciated by one having ordinary skill in the art that it may also be possible to represent similar actions with more than or less than three multi-directional input interfaces or alternative input interfaces. The multi-directional input interfaces 504,506,508 could also be used to move the second virtual character 124, or additional virtual characters, along a Y-plane, Y-axis, X-plane, X-axis, or combinations thereof. It may also be possible to provide input to one or more input interfaces using similar or different input components in communication with the controller 502. It is also possible to provide input to the controller 502 using non-tactile inputs, such as light sensors, sound sensors, motion sensors, any other now known or later developed non-tactile input, or combinations thereof.

Figure 7A:
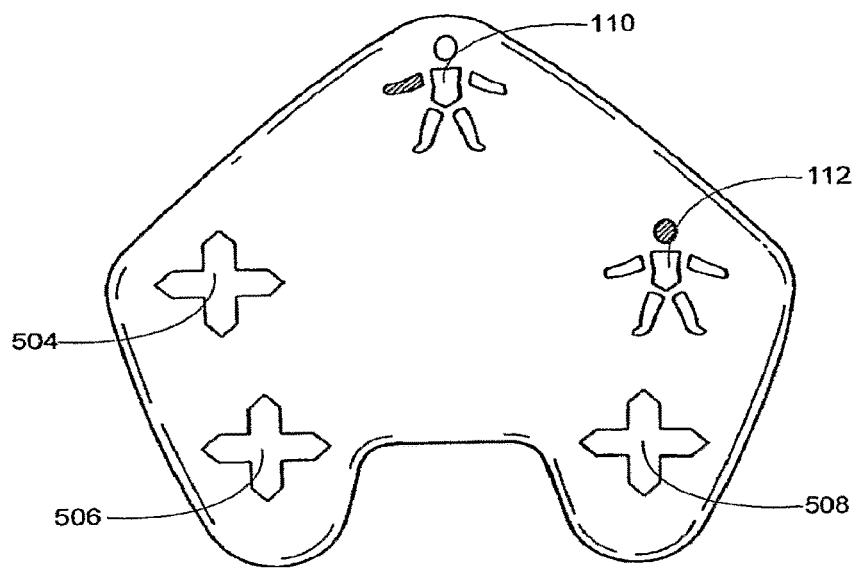
FIGS. 7A-7M are examples of using the embodiment of the input device shown in FIG. 5 for controlling virtual characters.

With reference to FIG. 5, FIGS. 7A-7M are examples of using one or more multi-directional input interfaces 504, 506,508 and one or more input interfaces 110,112 to perform a set of actions by the first virtual character 122, the second virtual character 124, or combinations thereof. FIG. 7A is an example of a face punch performed by using an input component on the first input interface 110 to select the "Self's" arm followed by using an input component on the second input interface 112 to select the "Other's" head.

Figure 7B:
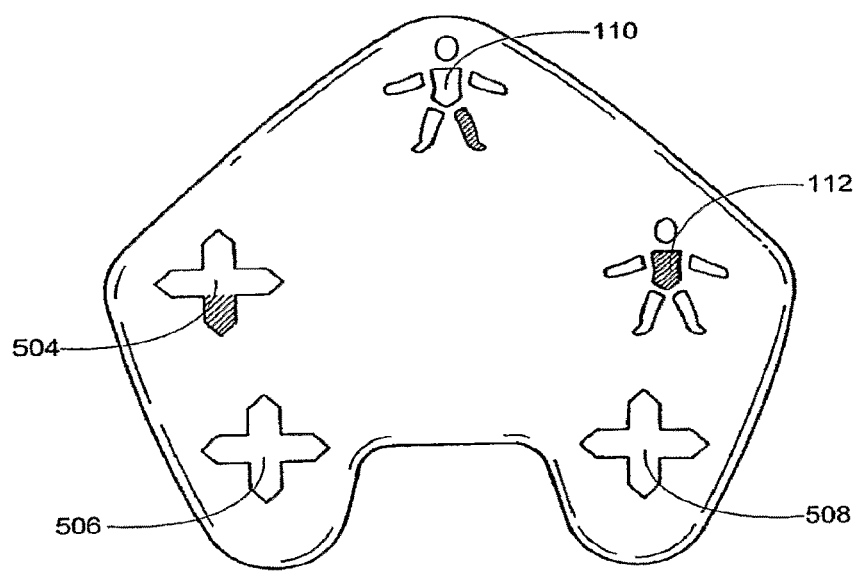

FIG. 7B is an example of a groin kick performed by selecting the "Self's" leg to be used, selecting select a downward input component on the first multi-directional input interface 506 to direct the kick towards the lower portion of the trunk where the groin is located, and then selecting the trunk using an input component on the second input interface 112.

Figure 7C:
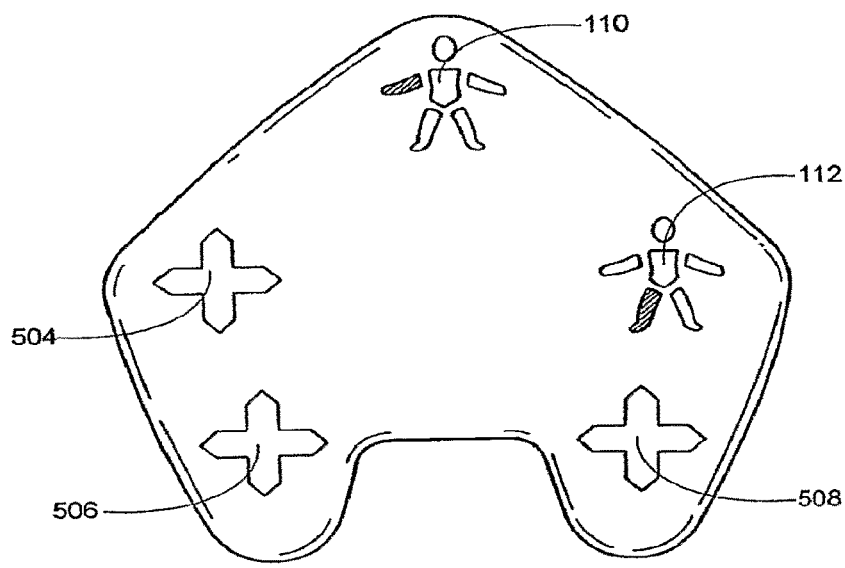

FIG. 7C is an example of a knee grab performed by selecting the "Self's" arm using the first input interface 110, pressing and holding the "Other's" leg on the second input interface 112; the grab would be directed to the knee as it is at the center of the lower limb.

Figure 7D:
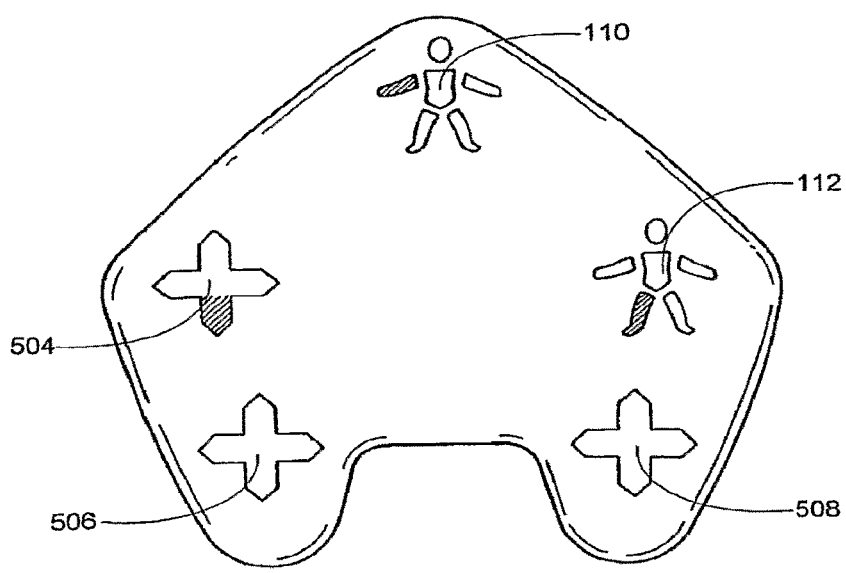

FIG. 7D is an example of an ankle grab performable by selecting the "Self's" arm using the first input interface 110, selecting a downward input component on the first multi-directional input interface 504 to direct the grab towards the lower portion of the targeted limb, pressing and holding the "Other's" targeted leg using the second input interface 112. The grab would be directed to the ankle as it is at the lower end of the lower limb.

Figure 7E:
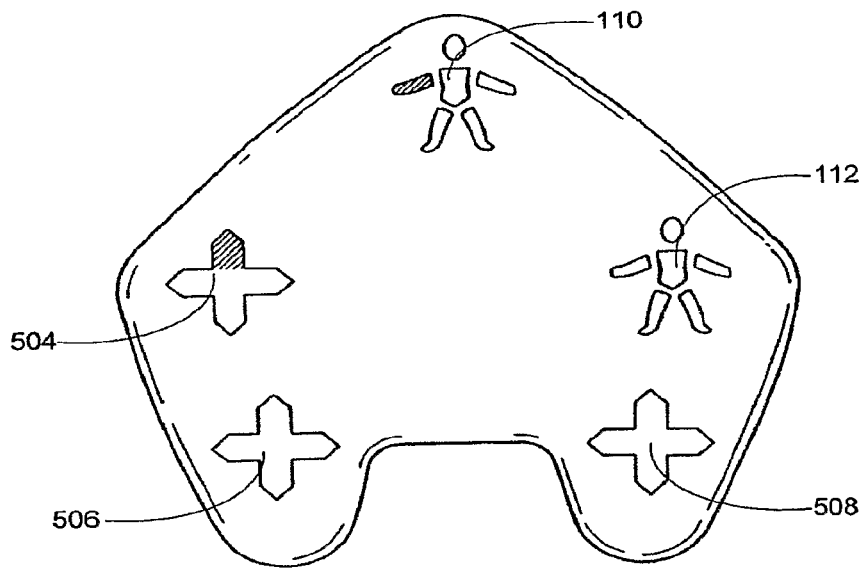

FIG. 7E is an example of performing two possible variations of blocking. In the first variation, a user selects the arm of the "Self" 122 using the first input interface 110, and then selects the direction of block by choosing a direction on the first multi-directional input interface 504. The second variation of blocking is performed where the user simply selects the direction of the block by choosing an input component on the first multi-directional input interface 504. This causes the leading arm to block. By failing to select other, the input is interpreted as a block or self alone type action.

Figure 7F:
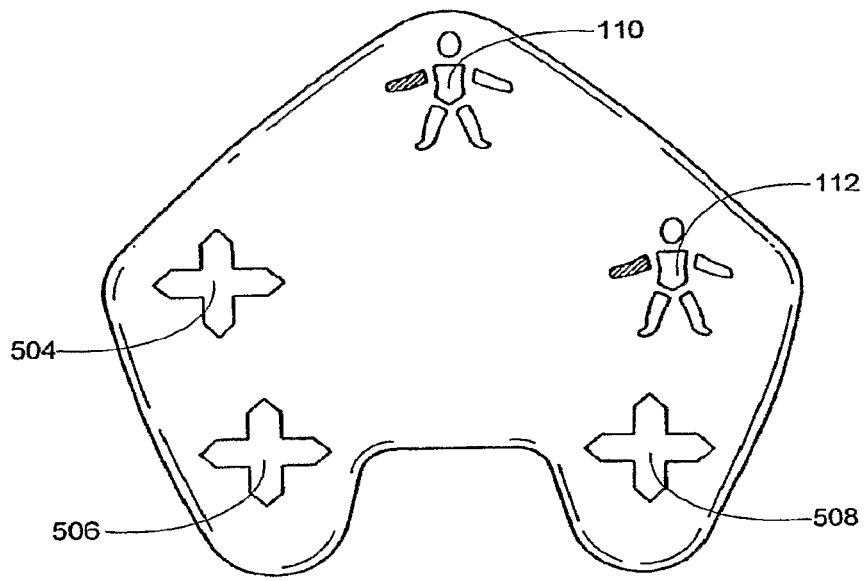

FIG. 7F is an additional example of blocking having third and fourth variations. The third variation of blocking is performed by selecting the arm of the "Self" 122 using the first input interface 110 and then selecting the attacking limb or portion of the "Other" 124 using the second input interface 112. The fourth variation of blocking may be performed by selecting the attacking limb or portion of the "Other" 124 using the second input interface 112.

Depending on the application, activation of the "Self's" limb may be an intended block of a strike by the "Other" 124, an intended fake of a strike against the "Other" 124, or the directional targeting of a strike against the other. The resulting action is determined by one or more processors, such as the input processor 116, the behavior processor 118, the state processor 208, or combinations thereof, and a node identifier is association with the input sequence database 210, the node database 212, or combinations thereof, would determine the resulting outcome. For example, the information that an attack has been initiated by the "Other" 124 against the "Self" 122 is used by one or more processors previously described, such as the state processor 208, or node identifiers to determine that the "Self" 122 is blocking the attacking limb.

Figure 7G:
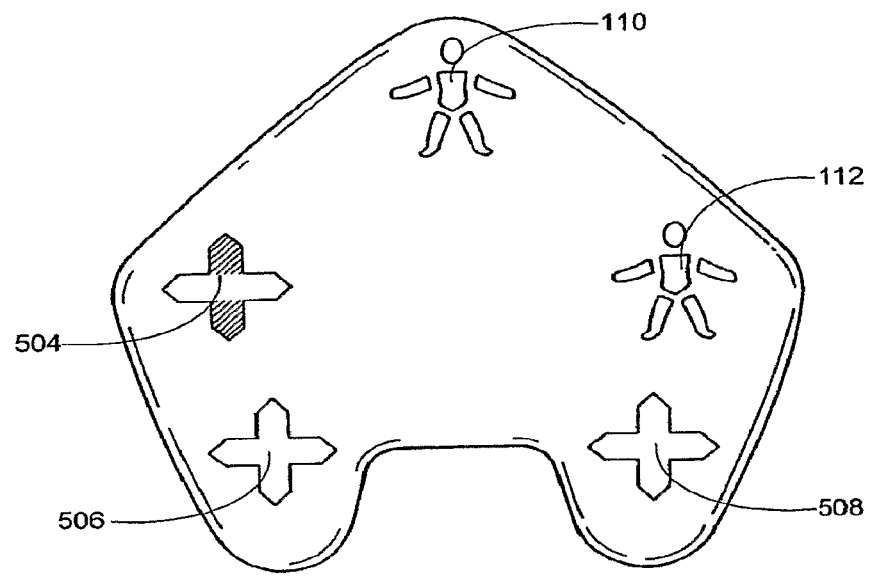

FIG. 7G is an example of changing the plane of movement, the axis of movement, or combinations thereof of the arm of the "Self" 122. In general, this may be performed by repeatedly pressing on the upward input component on the first multi-directional input interface 504 followed by pressing the downward input component on the downward multi-directional input interface 504. Pressing the upward input component once on the first multi-directional input interface 504 raises the arm in front of the virtual "Self's" body up to the level of the virtual "Self's" head. If the upward input component is pressed on the first multi-directional input interface 504 again, the arm raises above the head but with the elbow still somewhat bent. Up to this point, pressing the downward input component on the first multi-directional input interface 504 will lower the arm along the same plane it was raised. However, if the arm is raised further by another press on upward input component on the first multi-directional input interface 504, the arm raises straight up with no bend to the elbow. This is a potential point of no return as pressing the downward input component on the first multi-directional input interface 504 will not bring the arm back along the plane along which it was raised, but it will lower it along a different plane such as the sides of the virtual "Self" 122. It is possible to have several points of no-returns so that the arm can be moved along various planes in all directions and in all angles. It is possible to do the same for the other limbs or portions of the first virtual character 122, such as the leg or the head.

Figure 7H:
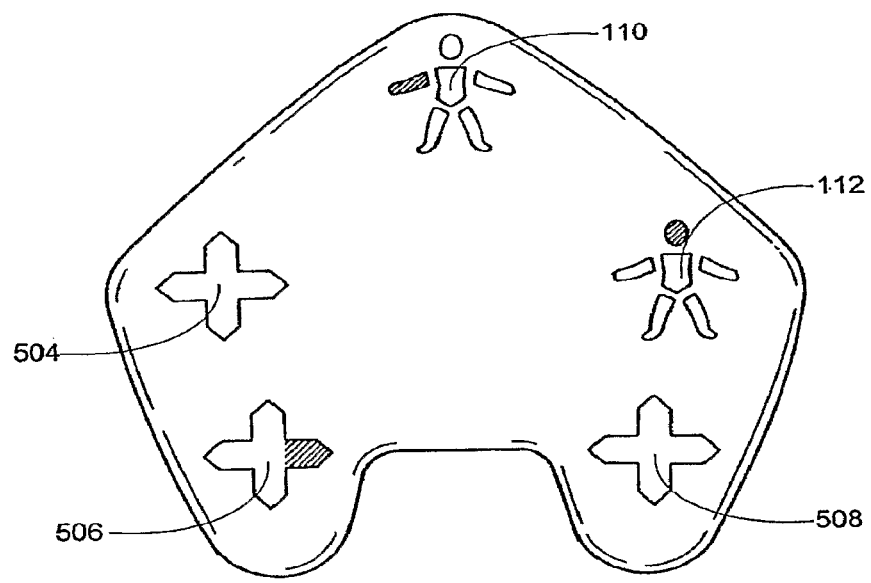
Figure 7I:
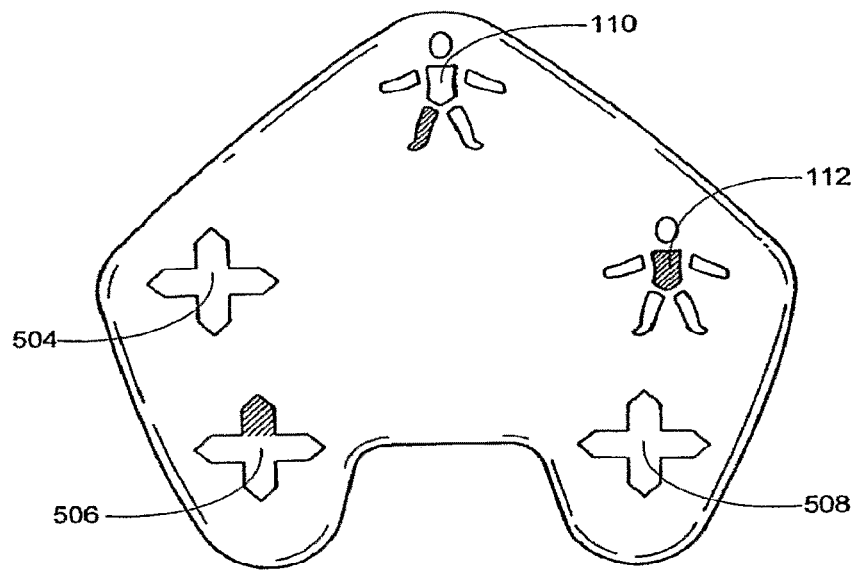

FIG. 7H is an example of a spinning punch to the head performed by causing the "Self" 122 to spin using the second multi-directional input interface 506, for example, by pressing the rightward input component, selecting the "Self's" arm to be used for the punch using the first input interface 110, and then selecting the part of the "Other" 124 that is being targeted, such as the head, using the second input interface 112, FIG. 7I is an example of a jumping kick to the trunk performed by causing the "Self" 122 to jump by pressing the upward input component on the second multi-directional input interface 506, selecting the "Self's" leg or legs to be used for the kick using the first input interface 110, and then selecting the part of the "Other" 124 that is being targeted, such as the trunk, by using the second input interface 112.

Figure 7J:
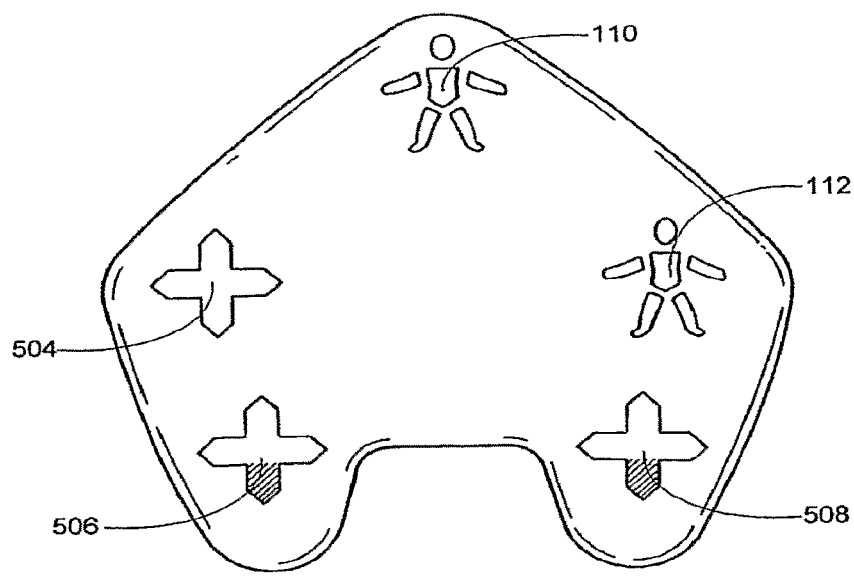

FIG. 7J is an example of performing a back roll by the first virtual character 122. The user firsts causes the "Self" 122 to sit by pressing the downward input component on the second multi-directional input interface 506, and then applying a force to the "Self" 122 to cause it to move backwards by pressing the downward input component on the third multi-directional input interface 508. Causing the "Self" 122 to move backwards may be done simultaneously as the causing the "Self" 122 to sit so that the momentum of sitting can be combined with going backwards to bring about the roll.

Figure 7K:
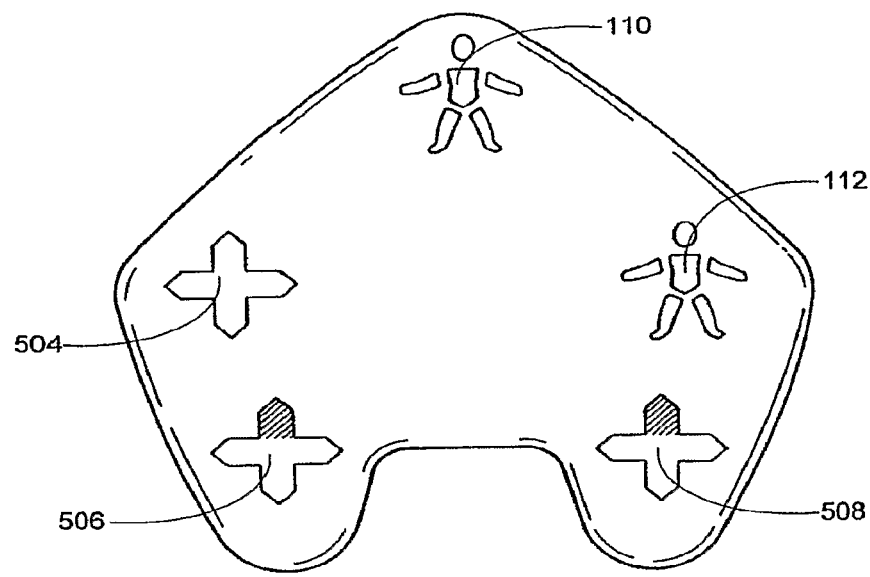

FIG. 7K is an example of performing a forward mid-air flip by the first virtual character 122. The user first causes the "Self" 122 to jump and become airborne by pressing the upward input component on the second multi-directional input interface 506, and then applying a force to the "Self" 122 to cause it to move forwards by pressing the upward input component on the third multi-directional input interface 508. Causing the "Self" 122 to move forwards may be done simultaneously as causing the "Self" 122 to jump so that the momentum of jumping can be combined with going forwards to bring about the forward mid-air flip.

Figure 7L:
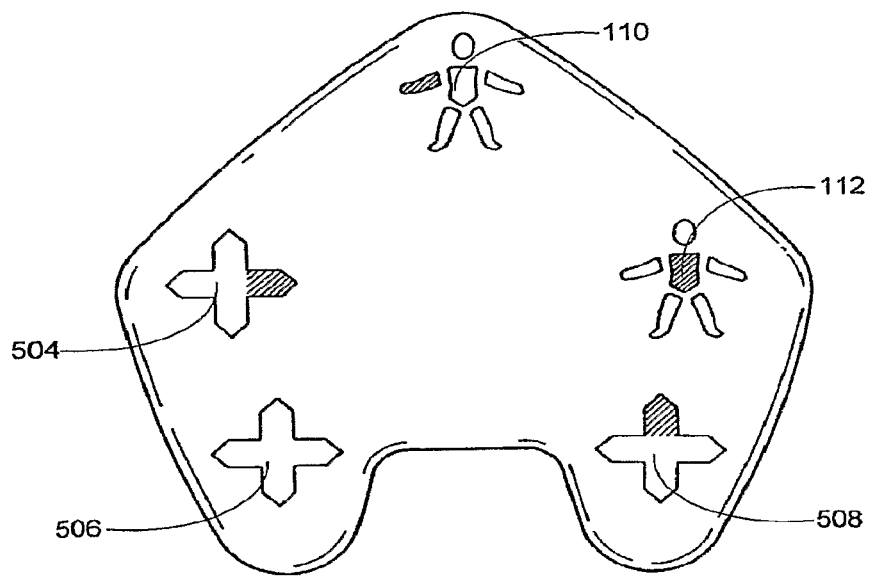

FIG. 7L is an example of a dance routine by putting an arm on the dance partner's left side and moving forward. The example may be performed by selecting the "Self's" arm to be used for touching the dance partner using the first input interface 110 and then modifying where on the "Other" 124 is being targeted by pressing the rightward input component on the first multi-directional input interface 504. Next, the user selects the trunk on the "Other" 124 by pressing and holding the input component on the second input interface 112 corresponding to the "Other's" trunk for a short time period, and finally, the user causes the virtual characters 122,124 to move forward by pressing the upward input component on the third multi-directional input interface 508.

Figure 7M:
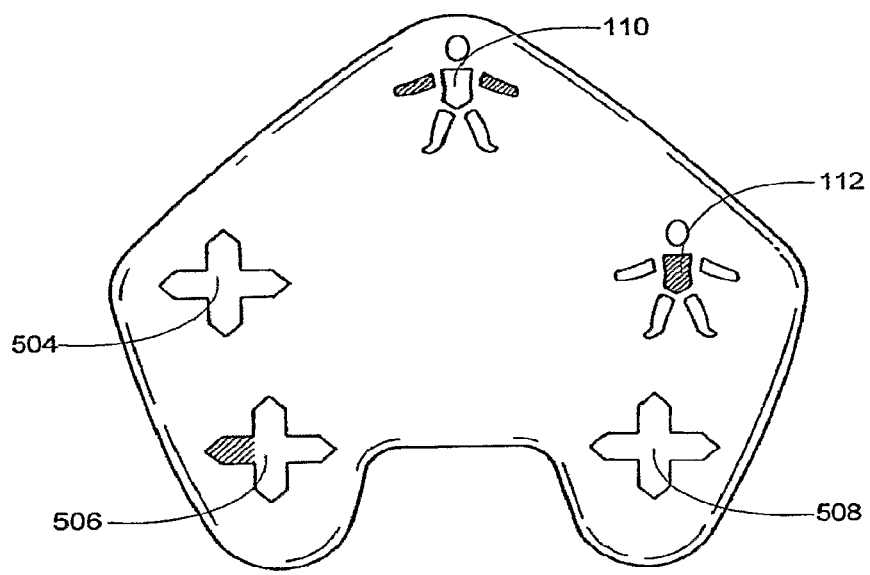

FIG. 7M is an example of throwing an opponent via rotation. In this example, the user selects the "Self's" arms using the first input interface 110 and then selects the "Other's" trunk using the input component on the second input interface 112 corresponding to the trunk. This causes the "Self" 122 to grab the "Other" 124. Finally, the user applies a rotational force, such as by using the leftward input component, using the second multi-directional input interface 506. The timing of when the hold on the opponent is released may be achieved by holding the second multi-directional input interface 506 down and then releasing it at the appropriate time. In the context of a martial arts videogame, the game can be programmed so that grabs will be two-handed even when one arm is selected. The arm that was selected plays the main role and the second arm plays a supporting role. Whereas by pressing and immediately releasing an input component representing the "Other's" trunk results in a punch by the "Self" 122, pressing and holding the same input component representing the "Other's" trunk results in a grab by the "Self" 122. In one embodiment, one or more processors previously described, such as the behavior processor 118 or the state processor 208, would determine how the input component is manipulated and the node database 212 with a node identifier would determine the resulting outcome.

By using combinations of input sequences and/or activation or deactivation switches, a fewer number of input components, such as buttons, may be used to map to a greater number of input options. In another example, the method may provide for an in-built preference for one or more input options. The in-built preference may reduce the number of input components needed to represent the user (i.e., the "Self" 122). For example, one representation of "Self" 122 uses different buttons for left and right arm. To move a particular arm, the corresponding button is depressed. Using in-built preference, the arm to be moved is assumed or defined based on other information. The other information may be the stance of the "Self" 122. One or more input components may define stance, such as one input rotating the "Self" 122 to be right side closer to the "Other" 124 and another input rotating the "Self" 122 to be left side closer to the "Other" 124. By depressing one input, the arm or leg on the side closest to or farthest from (depending on the in-built preference) the "Other" 124 moves. The in-built preference based on the stance allows reduction of the number of input components used to define an action by the "Self" 122.

Figure 8A:
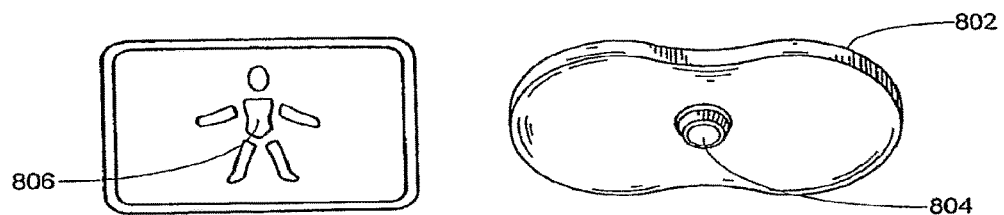
FIGS. 8A-D are examples of input devices with input components for controlling virtual characters.

The method disclosed herein further provides for assigning input options to multi-directional input interfaces or input components, where the number of multi-directional input interfaces or input components is less than the total number of input options available. An input option may describe the movement of a virtual character, or it may correspond to an action performable by a virtual character. An input option may also be a portion of an input sequence. Where the input device has sixteen input components available, the method may allow for sixteen input options in one arrangement. FIG. 8A is an example where a single input component 804 on an input device 802 is used to represent the different limbs or portions of a virtual character 806. For example, the virtual character 806 may be assigned an in-built preference such that the manipulation of the input component 804 causes a default action to be performed by the virtual character 806, such as a default limb for performing a punch, or that the default action is a punch.

Figure 8B:
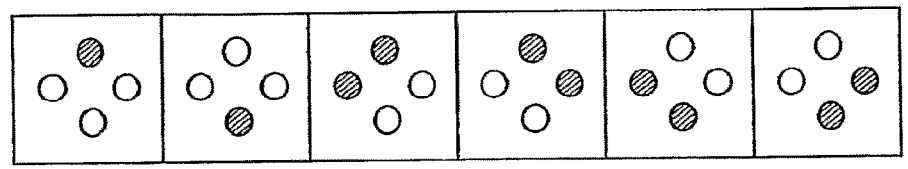

FIG. 8B is an example of where the where the input device has less total input components than a number of input options, where the input options correspond to directional input components on a multi-directional input interface. In FIG. 8B, the method reassigns the input components on the input device such that a group of input components on the input device can represent more than one multi-directional input interface. In FIG. 8B, the multi-directional input interface is represented by four (4) individual input components, aligned in a cardinal directional pattern, wherein each input component is assigned as a North, East, South, and West input component. By pressing the North and East input components simultaneously, the North-East direction is activated (see third illustration from left in FIG. 8B); and by pressing the South and West input components simultaneously, the South-West direction is activated (see sixth illustration from left in FIG. 8B); and so on.

Just as eight different directions can be represented by the four input components arranged in a cardinal direction pattern, the six main parts of the human body can be represented by the four input components shown. Starting with the leftmost illustration of FIG. 8B, the first two illustrations represent the head and torso, respectively. By pressing the North and East input components simultaneously, the left arm is activated (see third illustration from the left in FIG. 8B); by pressing the South and West input components simultaneously, the right leg is activated (see sixth illustration from left in FIG. 8B); and so on. In one embodiment, one or more processors previously described, such as the behavior processor 118 or the state processor 208, would determine how the input component is manipulated and the node database 212 with a node identifier would determine the resulting outcome.

Figure 8C:
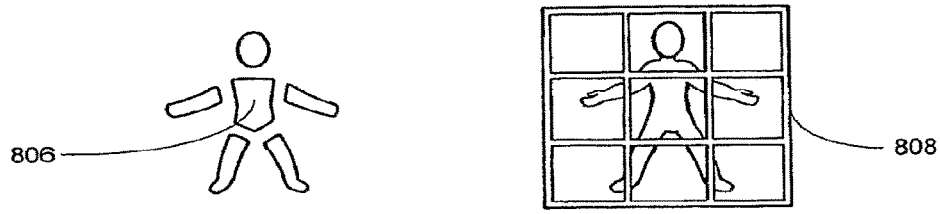

FIG. 8C is an example of how the portions or limbs of a virtual character 806 that would each be assigned to an input component of an input device, can be assigned to a touch-sensitive device, such a touch-screen display 808. The touch-screen display 808 is divided into quadrants such that each quadrant corresponds to a portion or limb of the virtual character 806.

Figure 8D:
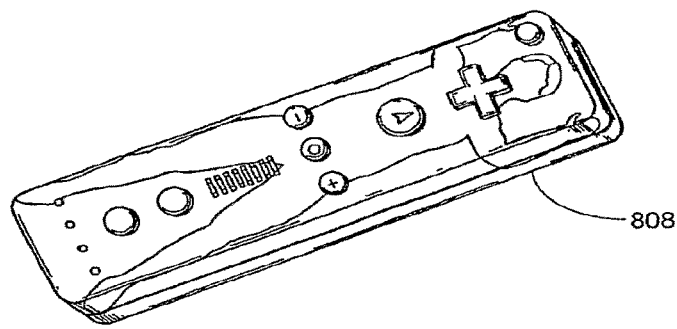

FIG. 8D is an example of how a motion sensitive controller 808 is mapped to a virtual character. In the examples shown in FIGS. 8A-8D, the mapping of the input option to an input component may be performed by one or more components of the system 102, the system 202, or combinations thereof, such as the input sequence database 210, the state processor 208, or the behavior processor 118.

Figure 9A:
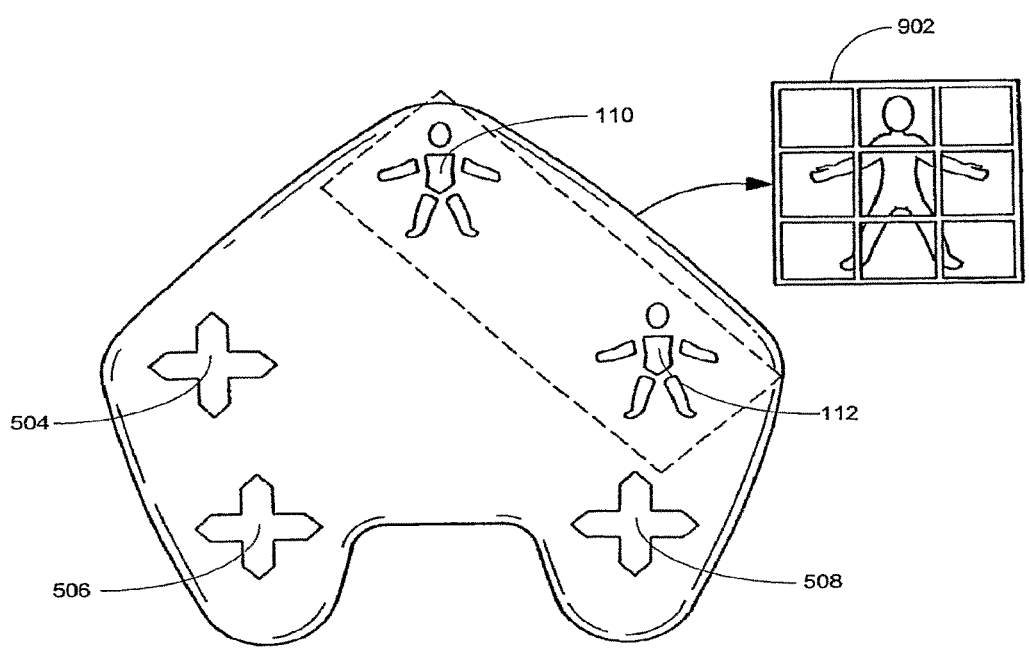
FIGS. 9A-D are examples of using abridgment to reduce the number of input components from one input device to another input device.

FIGS. 9A-9E are examples of using abridgment to reduce the number of input components from one input device to another input device. With reference to FIG. 5, FIG. 9A illustrates representing the first input interface 110 and the second input interface 112 with a single input interface 902. The single input interface 902 may represent the "Other" 124 and/or the "Self" 122. In one embodiment, where the single input interface 902 represents the "Other" 124, a single input on the input component representing the head may indicate a punch to head of the "Other" 124 by the "Self's" leading arm. Additional inputs may cause alternative actions, such as two inputs on the input component, one representing a hit to the head and another representing a kick by the "Self" 122 to the head of the "Other" 124.

Figure 9B:
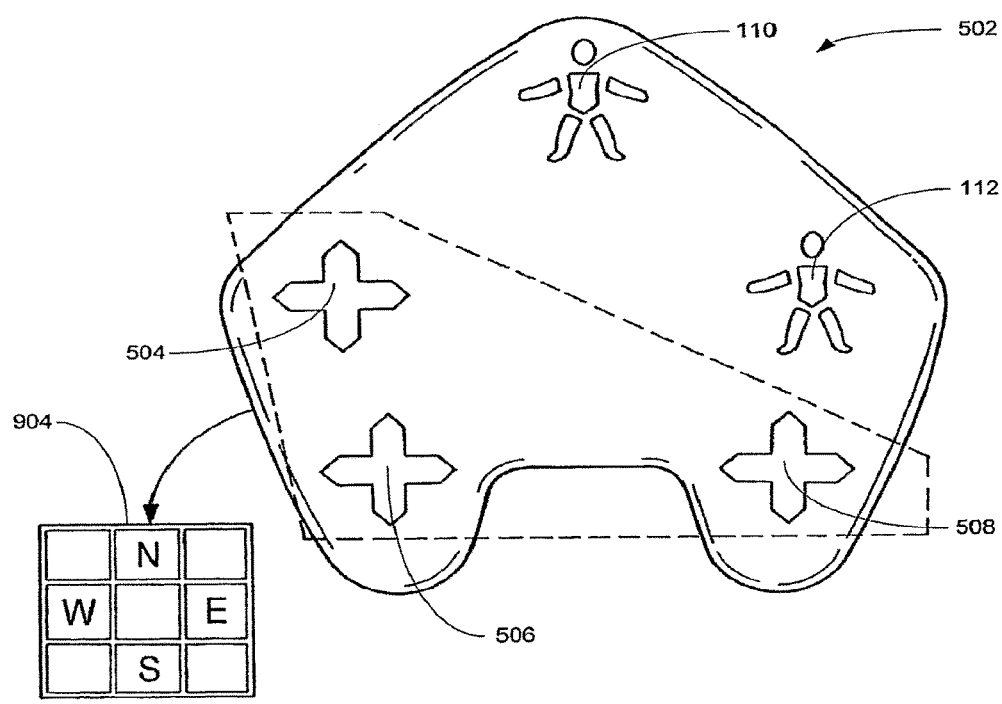

FIG. 9B illustrates reducing the number of input components on the multi-directional input interfaces 504,506,508 to a single input interface 904. For example, manipulating one input on the single presentation, such as clicking "N," may correspond to manipulating the input components on the first multi-directional input interface 504. Two inputs, such as two clicks, represents manipulating the input components of the second multi-directional input interface 504. In addition, manipulation of the signal input interface 904 can represent manipulation of a combination of input components on one or more of the multi-directional input interfaces 504,506,508. For example, three inputs, such as three clicks, on the single input interface 904 may correspond to an input corresponding to the manipulation of an input component on the second multi-directional input interface 506 and a manipulation of an input component on the third multi-directional input interface 508.

Figure 9C:
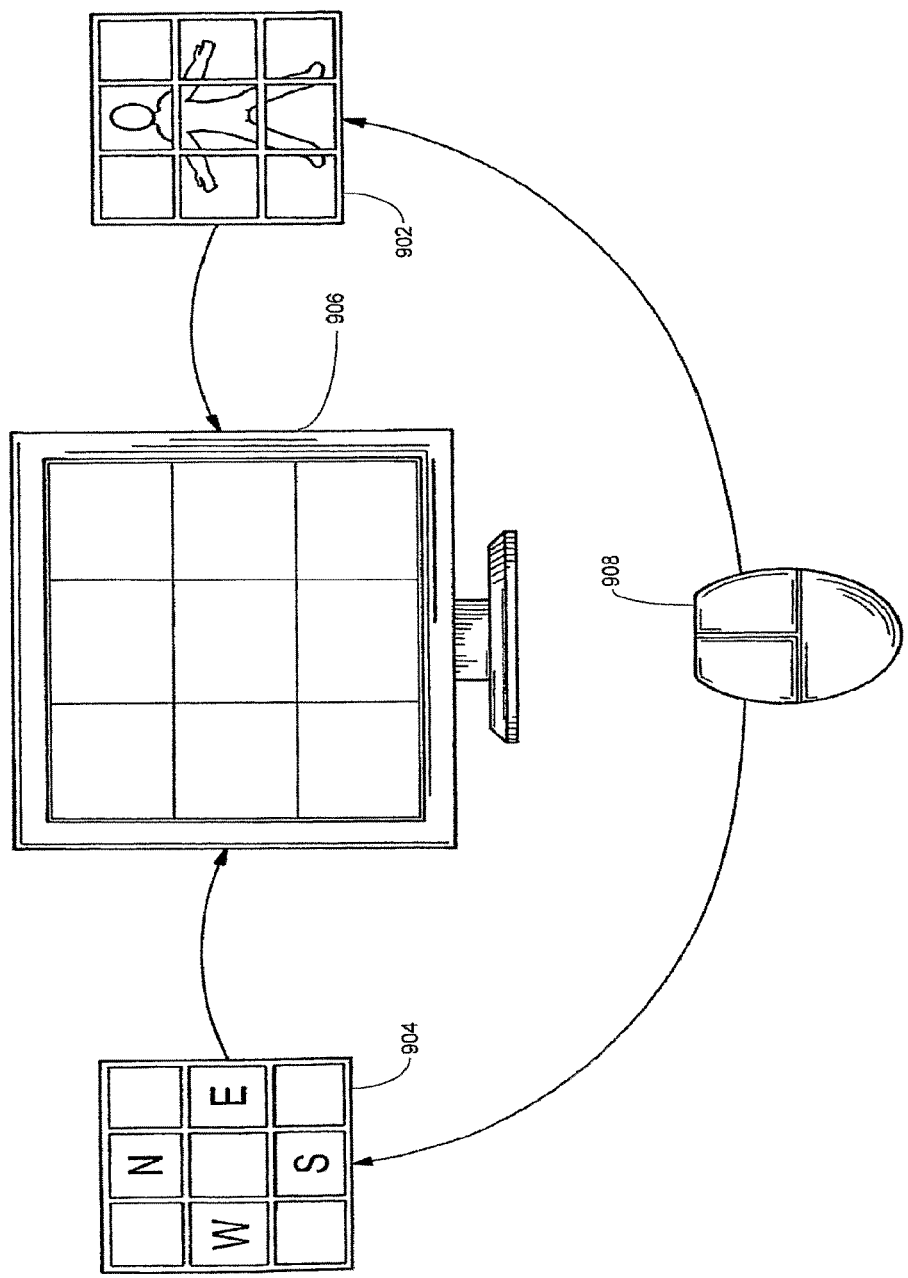

With reference to FIGS. 9A and 9B, FIG. 9C illustrates reducing the number of inputs on the first input interface 902 and the second input interface 904 by abridgement. A screen of a display device 906 can be divided into nine quadrants, and thus, be used as a 9-input multi-directional input interface. As shown in FIG. 9C, the left button of a mouse 908 is assigned to the second input interface 904 and the right button of the mouse 908 is assigned to the first input interface 902. Accordingly, right clicks of the mouse 908 could correspond to activating limbs or portions of the "Self" 122 or "Other" 124 of the first input interface 902, and left clicks of the mouse 908 could correspond to activation of the multiple multi-directional input interfaces represented by the second input interface 904.

Figure 9D:
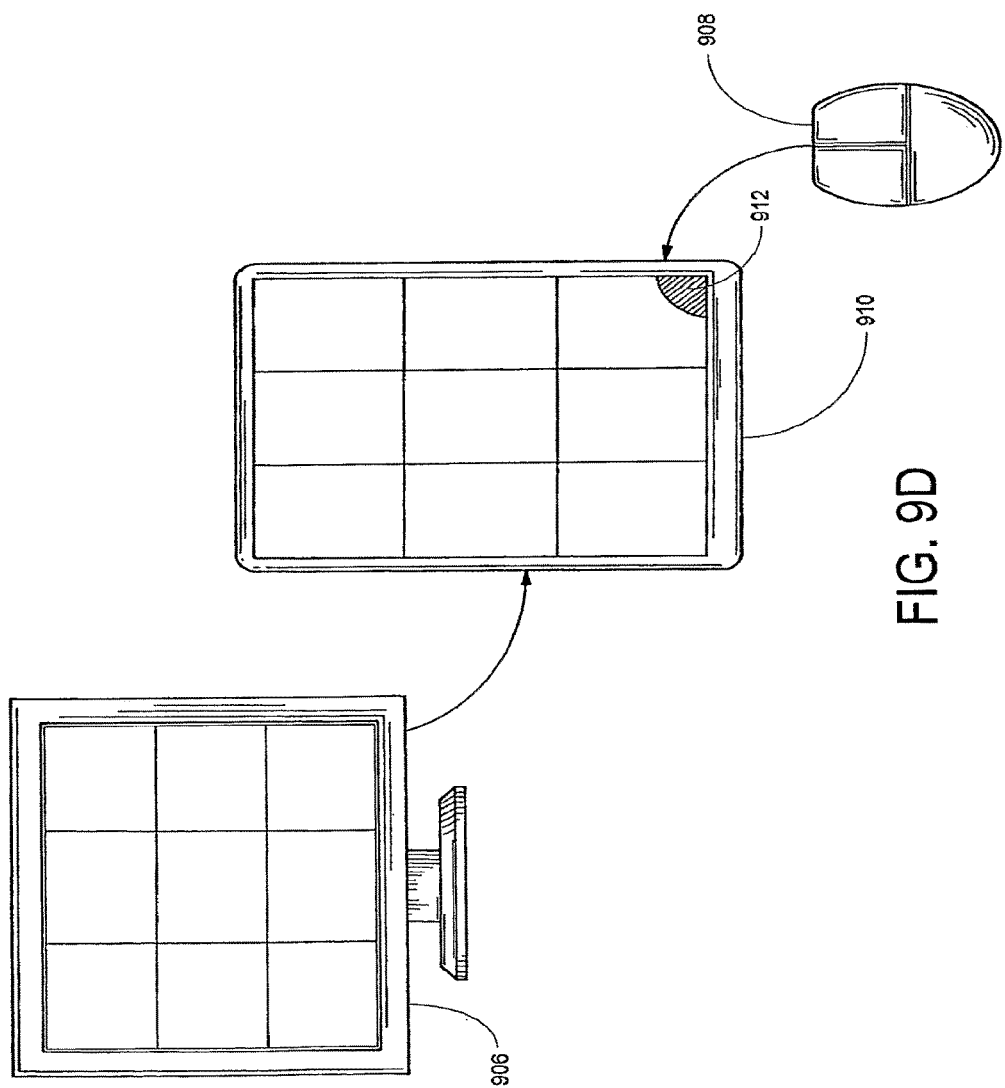

With reference to FIG. 9C, FIG. 9D illustrates the abridgment of the input components of a mouse 908 and a display device 906 to a touch-sensitive device 910, such as a personal display assistant, and a switching mechanism 912, such as a defined portion of the display of the touch-sensitive device 910. In this example, a user may use the switcher 912 to switch between the input options assigned to the input components of the display device 906 and the mouse 908, and use the display of the touch-sensitive device 910 to enter in input. A switching mechanism or switcher 912 can be any means of replacing the mouse 908 and distinguishing between the right and left inputs of the mouse 908 on the touch sensitive device 910.

The abridgement of the input interfaces may be performed by one or more components of the system 102 or the system 202, such as the behavior processor 118, the state processor 208, the input sequence database 210, node database 212 or combinations thereof. For example, and with reference to FIG. 9D and a martial art video game software application, the state processor 208 using the information from the input processor 116, input sequence database 210, node database 212, or combinations thereof, can make a determination that the switcher 912 is not activated. Then, with a first manipulation, such as pressing, of a single input component on the device 910 may indicate what body part or portion of the "Self" 122 is selected, and the second manipulation of a single input component on the touch-sensitive device 910 may indicate what body part or portion of the "Other" 122 is targeted. Similarly, if the switcher 912 is activated, manipulations, such as tapping or pressing, on a single input component on the touch-sensitive device 910 may correspond to presses on the single input interface 904 as previously described above.

While reference has been made to the method being used in the context of martial arts, it will be appreciated by one having ordinary skill in the art that other activities may also be possible. Such activities may include sport activities, such as baseball, basketball, or football. Other activities may include non-sport activities such as interactive adult entertainment, forms of dance (e.g., ice skating, ballroom, street dancing, break dancing, etc.), or gymnastics. Further activities may include those in the field of medicine or robotics, such as a doctor performing an operation on a patient, or directing a robot to perform an action on another object.

Furthermore, the systems and methods disclosed herein can be used for gaming on any device, such as personal computer, console, cellular phone, handheld device interactive television platform, cable or satellite set-top box or receiver or other gaming devices. Various types of games may use the system, such as martial arts, sports, action, adventure, dance, interactive adult entertainment, arcade or other types of games. The system may be provided for robotic control. In another embodiment, the system operates for programming or creating graphics, such as controlling a model in CGI.

I claim:

1. A method of altering the state of a virtual character, the method comprising:
   providing a virtual character with a numeric keypad mapped with different numbers to different parts of a body of the virtual character;
   assigning a node identifier as one of a first node and a second node, wherein the node identifier is selected as the first node from the first node and the second node, the first and second nodes corresponding to first and second different spatial relationships of the virtual character to another virtual character and multiple different relative positions of the virtual character to the other virtual character within the respective spatial relationship, the assigned node identifier identifying one of the different spatial relationships of the virtual character with the other virtual character, the first and second different spatial relationships being first and second state types, respectively, and the first and second nodes related to each other by a first input sequence of the numeric keypad;
   assigning a state identifier to the virtual character, wherein the state identifier is selected as a first state of the first state type from first and second states of the first state type, the first and second states being the different relative positions, the first state related to the second state by a second input sequence of the numeric keypad;
   arranging the virtual character based on the state identifier; and
   receiving an input indicative of a command to modify the state identifier assigned to the first virtual character, the input being one of the first or second input sequences, the one determining transition from the first state to the second state of the first node or from the first state to a third state of the second node; and
   displaying, in response to the input, the virtual character in the virtual environment transitioning from the first state to the second state or the third state of the second state type of the second node.

2. The method of claim 1 further comprising:
   determining the second state of the first state type based on the assigned node identifier;
   determining a first state of a second state type based on the assigned node identifier;
   modifying the state identifier associated with the virtual character based on the received input and at least one of the second state of the first state type and the first state of the second state type;
   arranging the virtual character based on the modified state identifier; and
   modifying the node identifier assigned to the virtual character based on the modified state identifier.

3. The method of claim 2 wherein modifying the state identifier comprises associating the state identifier with the first state of the second state type.

4. The method of claim 2 wherein modifying the node identifier comprises associating the node identifier with a second node, and wherein the second node is a secondary node.

5. The method of claim 1 further comprising:
   determining the second state of the first state type based on the assigned node identifier;
   modifying the state identifier associated with the virtual character based on the received input and the determined second state;
   arranging the virtual character based on the modified state identifier; and
   modifying the node identifier assigned to the virtual character based on the modified state identifier.

6. The method of claim 5 wherein modifying the state identifier comprises associating the state identifier with the determined second state.

7. The method of claim 5 wherein modifying the node identifier comprises associating the node identifier with the second node, wherein the second node is a primary node.

8. The method of claim 1 wherein the first node is a primary node.

9. The method of claim 1 wherein the first state is indicative of a resting position.

10. A system operable to alter the state of a virtual character, the system comprising:
    a node database of a plurality of virtual character nodes corresponding to different relationships of the virtual character with another virtual character, wherein each node is associated with different one of the relationships of the virtual character with the other virtual character and a plurality of first numeric input sequences on a numeric keypad linking the virtual character nodes and relative positions;
    an input sequence database of a plurality of second numeric input sequences, wherein each second numeric input sequence is associated with a virtual character state of a different relative position of the virtual character with the other virtual character in the corresponding relationship of the corresponding node, the same second numeric sequence for one of the nodes being for a different virtual character state than for another of the nodes;
    wherein the virtual character is assigned a state identifier associated with the virtual character state and a node identifier associated with one of the nodes;
    an input processor operable to receive a numeric input sequence indicative of a command to modify the state identifier assigned to the virtual character; and
    a state processor operable to select a state from the node database based on the input sequence and the node identifier assigned to the virtual character.

11. The system of claim 10 wherein at least one virtual character node is a secondary node.

12. The system of claim 10 wherein at least one virtual character state is a resting position.

13. The system of claim 10 wherein at least one virtual character state is a directional position.

14. A method for controlling interaction between characters with a user input device, the method comprising:
- mapping first alphanumeric keys of a keypad to different body parts of a first character and second alphanumeric keys of the keypad to different body parts of a second character;
- associating a first plurality of alphanumeric input options with a first node, the first node corresponding to a first spatial inter-relationship of the first character with the second character, and the first plurality of alphanumeric input options corresponding to different relative positions of the body parts of the first character with the second character while maintaining the first spatial inter-relationship;
- associating a second plurality of alphanumeric input options with a second node, the second node corresponding to a second spatial inter-relationship of the first character with the second character, the second spatial inter-relationship different than the first inter-relationship, and the second plurality of alphanumeric input options corresponding to different relative positions of the body parts of the first character with the second character while maintaining the second spatial inter-relationship, the second plurality of alphanumeric input options having at least one same alphanumeric input option as the first plurality of input options;
- receiving a selection of the first or second node from the keypad; and
- controlling interaction of the first character with the second character in response to alphanumeric input from the keypad, the controlling being a function of the first plurality of alphanumeric input options where the selection was of the first node and a function of the second plurality of alphanumeric input options where the selection was of the second node, the same alphanumeric input associated with different action as a function of the selection of the first and second nodes.

15. The method of claim 14 wherein the first spatial inter-relationship is the second character facing the first character, wherein the second spatial inter-relationship is the second character facing away from the first character, wherein the same alphanumeric input option comprises selecting a head of the first character and a head of the second character, wherein controlling comprises contacting a face of the first character with a face of the second character for selection of the first node and contacting the face of the first character with a back of a head of the second character for selection of the second node.

16. A method for controlling interaction between characters with a user input device, the method comprising:
- assigning different spatial inter-relationships of a first virtual character with a second virtual character to at least first and second nodes;
- assigning a plurality of interaction options of the first virtual character with the second virtual character for each of the at least first and second nodes, the interaction options for each of the first and second nodes corresponding to possible interactions given the different spatial inter-relationships such that the interaction options for each of the first and second nodes maintains the respective spatial inter-relationship during the interaction, and wherein the interaction options map body parts of the first and second virtual characters to different keys of a keypad; and
- controlling the first virtual character relative to the second virtual character as a function of selection of one of the at least first and second nodes on the keypad and selection of one of the interaction options on the keypad.

* * * * *